(12) United States Patent
Denisart et al.

(10) Patent No.: US 10,098,494 B2
(45) Date of Patent: Oct. 16, 2018

(54) DEVICE FOR PREPARING A LIQUID BEVERAGE FROM A CARTRIDGE

(71) Applicant: NESTEC S.A., Vevey (CH)

(72) Inventors: Jean-Luc Denisart, Cully (CH); Alain Meier, Caneggio (CH); Enzo Bonacci, Savigny (CH); HansPeter Pleisch, Corseaux (CH); Christian Talon, Vufflens-le-Chateau (CH)

(73) Assignee: Nestec S.A., Vevey (CH)

( * ) Notice: Subject to any disclaimer, the term of this patent is extended or adjusted under 35 U.S.C. 154(b) by 1098 days.

(21) Appl. No.: 14/136,954

(22) Filed: Dec. 20, 2013

(65) Prior Publication Data
US 2014/0109772 A1   Apr. 24, 2014

Related U.S. Application Data

(62) Division of application No. 12/530,057, filed as application No. PCT/EP2008/051828 on Feb. 15, 2008.

(30) Foreign Application Priority Data

Mar. 6, 2007   (EP) .................................... 07103610

(51) Int. Cl.
*A47J 31/36*   (2006.01)

(52) U.S. Cl.
CPC ..... *A47J 31/3695* (2013.01); *Y10T 137/0396* (2015.04)

(58) Field of Classification Search
CPC .......... A47J 31/34; A47J 31/36; A47J 31/545; A47J 31/407; A47J 31/3633;
(Continued)

(56) References Cited

U.S. PATENT DOCUMENTS 2,783,704 A * 3/1957 Liebelt .................... A47J 31/38
141/329
2,905,074 A * 9/1959 Newman ................ A47G 19/14
222/173
(Continued)

FOREIGN PATENT DOCUMENTS

EP   1153561   11/2001
EP   1440910   7/2004
(Continued)

OTHER PUBLICATIONS

Krups KP 2000 On-Line Product, http://www.preis.de/produkte/Krups-KP-2000-Dolce-Gusto-Nespresso/117661 . . . , Aug. 24, 2011 (2 pages).

(Continued)

*Primary Examiner* — Eric Stapleton
(74) *Attorney, Agent, or Firm* — K&L Gates LLP

(57) ABSTRACT

Device for preparing a liquid beverage from a cartridge, comprising a supply unit (2) for supplying injection fluid to the cartridge (10), a cartridge holder (6) configured to accept and support a cartridge; the said cartridge holder being detachable from the device and complementary insertion means (7) are configured to allow the cartridge holder to be inserted from its detached position into the supply unit (2). The injection means (5) are provided and form part of the supply unit. The injection means are able to move into engagement with the cartridge and relative to the injection unit. Sealing means (16) are also provided in association with the injection means in order to provide sealing locally between the said injection means and the cartridge.

22 Claims, 18 Drawing Sheets

(58) Field of Classification Search
CPC .............. A47J 31/3695; A47J 31/0642; A47J 31/3628; A47J 31/002; A47J 31/0673; A47J 31/3623; A47J 31/3676; Y10T 137/0396; B65D 85/8043
USPC ........ 99/280, 289 R, 295–297, 302 P, 302 R, 99/303; 426/431–434, 594–596; 137/317–319
See application file for complete search history.

(56) References Cited

U.S. PATENT DOCUMENTS

| | | | | |
|---|---|---|---|---|
| 2,905,075 | A * | 9/1959 | Liebelt | B65D 25/00 99/295 |
| 2,939,381 | A * | 6/1960 | McBride | A47J 31/3628 141/329 |
| 2,952,202 | A * | 9/1960 | Renner | A47J 31/3628 222/83.5 |
| 3,139,343 | A * | 6/1964 | Baselt | A23F 5/243 222/146.4 |
| 3,209,676 | A * | 10/1965 | Zimmermann | A47J 31/3657 206/0.5 |
| 3,232,212 | A * | 2/1966 | Karlen | G05D 23/1951 99/283 |
| 3,260,190 | A * | 7/1966 | Levinson | A47J 31/0642 222/83.5 |
| 3,292,527 | A * | 12/1966 | Stasse | A47J 31/0673 222/541.3 |
| 3,295,998 | A * | 1/1967 | Goros | A47J 31/3633 221/124 |
| 3,374,927 | A * | 3/1968 | Schmidt | B67B 7/26 222/400.7 |
| 3,384,004 | A * | 5/1968 | Perlman | A47J 31/057 99/289 R |
| 3,385,201 | A * | 5/1968 | Martin | A47J 31/057 392/442 |
| 3,385,475 | A * | 5/1968 | Loe | F15B 21/00 184/6 |
| 3,387,553 | A * | 6/1968 | Tavera | A47J 31/04 426/77 |
| 3,391,632 | A * | 7/1968 | Colonna | A47J 31/053 426/112 |
| 3,403,617 | A * | 10/1968 | Lampe | A47J 31/005 222/86 |
| 3,407,812 | A * | 10/1968 | Lucas | A61M 1/02 494/10 |
| 3,425,338 | A * | 2/1969 | Vittoe | A47J 31/057 99/289 R |
| 3,443,508 | A * | 5/1969 | Reynolds | A47J 31/10 99/282 |
| 3,444,804 | A * | 5/1969 | Stozek | A47J 31/057 99/295 |
| 3,450,024 | A * | 6/1969 | Martin | A47J 31/057 99/295 |
| 3,470,812 | A * | 10/1969 | Levinson | A47J 31/005 99/295 |
| 3,584,767 | A * | 6/1971 | Dawson | B67B 7/28 222/83.5 |
| 3,607,297 | A * | 9/1971 | Fasano | B65D 85/8043 426/431 |
| 3,628,444 | A * | 12/1971 | Mazza | A47J 31/3695 99/275 |
| 3,752,362 | A * | 8/1973 | Risener | B67D 1/08 222/400.7 |
| 3,754,463 | A * | 8/1973 | Vernooy | A47J 31/0642 99/295 |
| 3,926,339 | A * | 12/1975 | Openchowski | B67D 3/00 222/528 |
| 4,136,202 | A * | 1/1979 | Favre | B65D 85/8043 206/0.5 |
| 4,220,259 | A * | 9/1980 | Lagneaux | A47J 31/407 222/103 |
| 4,259,573 | A * | 3/1981 | Prober | G01N 27/622 250/282 |
| 4,429,623 | A * | 2/1984 | Illy | A47J 31/0668 99/295 |
| 4,471,689 | A * | 9/1984 | Piana | B65D 85/8043 422/282 |
| 4,579,048 | A * | 4/1986 | Stover | A47J 31/002 99/280 |
| 4,806,375 | A * | 2/1989 | Favre | A23F 5/26 426/433 |
| 4,843,955 | A * | 7/1989 | Henn | A47J 31/0605 99/295 |
| 4,846,052 | A * | 7/1989 | Favre | A47J 31/3695 99/295 |
| 4,921,712 | A * | 5/1990 | Malmquist | A47J 31/057 426/110 |
| 5,008,013 | A * | 4/1991 | Favre | B01D 29/03 210/482 |
| 5,012,629 | A * | 5/1991 | Rehman | B65B 29/02 206/0.5 |
| 5,190,652 | A * | 3/1993 | van Thoor | A47J 31/06 210/474 |
| 5,197,374 | A * | 3/1993 | Fond | A47J 31/0647 99/295 |
| 5,242,702 | A * | 9/1993 | Fond | A47J 31/0668 426/112 |
| 5,243,164 | A * | 9/1993 | Erickson | A47J 31/02 219/689 |
| 5,259,296 | A * | 11/1993 | Mikael | A47J 31/3614 99/280 |
| 5,327,815 | A * | 7/1994 | Fond | A47J 31/0668 99/295 |
| 5,343,799 | A * | 9/1994 | Fond | A47J 31/0631 99/295 |
| 5,388,502 | A * | 2/1995 | Hufnagl | A47J 31/3671 99/295 |
| 5,398,595 | A * | 3/1995 | Fond | A47J 31/0668 99/295 |
| 5,398,596 | A * | 3/1995 | Fond | A47J 31/3695 99/295 |
| 5,402,707 | A * | 4/1995 | Fond | A47J 31/0678 99/295 |
| 5,454,293 | A * | 10/1995 | Santi | A47J 31/0657 99/289 R |
| 5,472,719 | A * | 12/1995 | Favre | A47J 31/0673 426/112 |
| 5,598,764 | A * | 2/1997 | Bambi | A47J 31/002 99/295 |
| 5,649,472 | A * | 7/1997 | Fond | A47J 31/0673 426/433 |
| 5,656,316 | A * | 8/1997 | Fond | A47J 31/0678 426/112 |
| 5,709,539 | A * | 1/1998 | Hammer | F04B 43/1253 417/477.11 |
| 5,723,861 | A * | 3/1998 | Carnahan | G01N 27/622 250/287 |
| 5,755,149 | A * | 5/1998 | Blanc | A47J 31/3623 99/289 T |
| 5,762,987 | A * | 6/1998 | Fond | A47J 31/0673 426/433 |
| 5,773,067 | A * | 6/1998 | Freychet | A23F 5/243 222/129.1 |
| 5,776,527 | A * | 7/1998 | Blanc | A47J 31/3633 206/5 |
| 5,794,519 | A * | 8/1998 | Fischer | A47J 31/0668 99/295 |
| 5,801,820 | A * | 9/1998 | Bysouth | G01N 35/085 356/36 |
| 5,826,492 | A * | 10/1998 | Fond | A47J 31/0673 99/295 |
| 5,840,189 | A * | 11/1998 | Sylvan | B65D 85/8043 210/233 |
| 5,897,899 | A * | 4/1999 | Fond | A47J 31/0678 426/112 |
| 5,974,949 | A * | 11/1999 | Weber | A47J 31/46 99/289 R |

(56) References Cited

U.S. PATENT DOCUMENTS

| | | | | |
|---|---|---|---|---|
| 6,026,732 A * | 2/2000 | Kollep | A47J 31/0668 | 99/295 |
| 6,068,871 A * | 5/2000 | Fond | B65D 85/8046 | 426/112 |
| 6,082,247 A * | 7/2000 | Beaulicu | A47J 31/402 | 222/146.5 |
| 6,148,717 A * | 11/2000 | Lassota | A47J 31/002 | 222/1 |
| 6,182,554 B1 * | 2/2001 | Beaulieu | A47J 31/3628 | 99/289 R |
| 6,260,190 B1 * | 7/2001 | Ju | G06F 9/3834 | 712/205 |
| 6,490,966 B2 * | 12/2002 | Mariller | A47J 31/3676 | 99/289 R |
| 6,499,388 B2 * | 12/2002 | Schmed | A47J 31/3628 | 99/295 |
| 6,606,938 B2 * | 8/2003 | Taylor | A47J 31/0642 | 426/433 |
| 6,607,762 B2 * | 8/2003 | Lazaris | B65D 85/8043 | 206/0.5 |
| 6,644,173 B2 * | 11/2003 | Lazaris | A47J 31/3628 | 99/295 |
| 6,698,332 B2 * | 3/2004 | Kollep | A47J 31/4407 | 99/289 R |
| 6,708,600 B2 * | 3/2004 | Winkler | A47J 31/3695 | 99/295 |
| 6,758,130 B2 * | 7/2004 | Sargent | A23F 3/14 | 426/115 |
| 6,772,676 B2 * | 8/2004 | Lassota | A47J 31/002 | 222/639 |
| 6,786,134 B2 * | 9/2004 | Green | A47J 31/3633 | 99/289 P |
| 6,799,503 B2 * | 10/2004 | Kollep | A47J 31/369 | 99/289 R |
| 6,805,042 B2 * | 10/2004 | Mordini | A47J 31/06 | 99/295 |
| 6,810,788 B2 * | 11/2004 | Hale | B65D 85/8043 | 426/433 |
| 6,832,542 B2 * | 12/2004 | Hu | A47J 31/0668 | 99/295 |
| 6,854,378 B2 * | 2/2005 | Jarisch | A47J 31/3695 | 426/433 |
| 6,857,352 B2 * | 2/2005 | Fischer | A47J 31/3623 | 99/280 |
| 6,904,840 B1 * | 6/2005 | Pfeifer | A47J 31/0668 | 99/289 R |
| 6,935,222 B2 * | 8/2005 | Chen | A47J 31/0668 | 99/295 |
| 6,955,116 B2 * | 10/2005 | Hale | A47J 31/0673 | 99/289 R |
| 6,994,015 B2 * | 2/2006 | Bruinsma | A47J 31/4407 | 99/289 R |
| 7,097,074 B2 * | 8/2006 | Halliday | A47J 31/0673 | 222/325 |
| 7,165,488 B2 * | 1/2007 | Bragg | A47J 31/0673 | 426/433 |
| 7,213,506 B2 * | 5/2007 | Halliday | A47J 31/4407 | 426/115 |
| 7,219,598 B2 * | 5/2007 | Halliday | A47J 31/4407 | 426/115 |
| 7,231,869 B2 * | 6/2007 | Halliday | A47J 31/0673 | 99/289 R |
| 7,237,475 B2 * | 7/2007 | Chen | A47J 31/0626 | 99/289 R |
| 7,243,598 B2 * | 7/2007 | Halliday | A47J 31/4407 | 426/115 |
| 7,255,039 B2 * | 8/2007 | Halliday | A47J 31/0673 | 49/248 |
| 7,287,461 B2 * | 10/2007 | Halliday | A47J 31/4407 | 426/115 |
| 7,308,851 B2 * | 12/2007 | Halliday | B65D 85/8043 | 426/115 |
| 7,316,178 B2 * | 1/2008 | Halliday | A47J 31/0673 | 99/295 |
| 7,322,277 B2 * | 1/2008 | Halliday | A47J 31/4407 | 426/112 |
| 7,328,651 B2 * | 2/2008 | Halliday | A47J 31/0673 | 426/115 |
| 7,337,704 B2 * | 3/2008 | Hammad | A47J 31/545 | 99/281 |
| 7,340,990 B2 * | 3/2008 | Halliday | A47J 31/4407 | 426/115 |
| 7,418,899 B2 * | 9/2008 | Halliday | A47J 31/4407 | 426/77 |
| 7,533,603 B2 * | 5/2009 | Halliday | A47J 31/446 | 426/115 |
| 7,533,604 B2 * | 5/2009 | Halliday | A47J 31/4407 | 426/77 |
| 7,578,584 B2 * | 8/2009 | Hattori | B41J 2/17513 | 347/85 |
| 7,592,027 B2 * | 9/2009 | Halliday | A47J 31/0673 | 426/432 |
| 7,607,385 B2 * | 10/2009 | Halliday | A47J 31/0673 | 99/280 |
| 7,640,843 B2 * | 1/2010 | Halliday | A47J 31/4407 | 426/115 |
| 7,673,558 B2 * | 3/2010 | Panesar | A47J 31/0673 | 99/275 |
| 7,677,158 B2 * | 3/2010 | McDuffie | A47J 31/4407 | 99/289 R |
| 7,681,491 B2 * | 3/2010 | Agon | A47J 31/061 | 99/293 |
| 7,730,829 B2 * | 6/2010 | Hammad | A47J 31/0684 | 99/295 |
| 7,832,328 B2 * | 11/2010 | Koeling | A47J 31/0678 | 99/284 |
| 7,946,217 B2 * | 5/2011 | Favre | A47J 31/0668 | 426/433 |
| 8,307,754 B2 * | 11/2012 | Ternite | A47J 31/0673 | 99/280 |
| 2001/0052294 A1 * | 12/2001 | Schmed | A47J 31/3628 | 99/295 |
| 2002/0023543 A1 * | 2/2002 | Schmed | A47J 31/3623 | 99/295 |
| 2002/0088348 A1 * | 7/2002 | Cortese | A47J 31/3638 | 99/295 |
| 2002/0144604 A1 * | 10/2002 | Winkler | A47J 31/3695 | 99/302 R |
| 2003/0066431 A1 * | 4/2003 | Fanzutti | A47J 31/36 | 99/279 |
| 2003/0071056 A1 * | 4/2003 | Hale | A47J 31/3638 | 222/83 |
| 2004/0045443 A1 * | 3/2004 | Lazaris | B65D 85/8043 | 99/279 |
| 2004/0250686 A1 * | 12/2004 | Hale | A47J 31/0673 | 99/295 |
| 2005/0051478 A1 * | 3/2005 | Karanikos | B65D 85/8043 | 210/469 |
| 2005/0084569 A1 * | 4/2005 | Hu | A47J 31/0668 | 426/118 |
| 2005/0129809 A1 * | 6/2005 | Cortese | A47J 31/3633 | 426/77 |
| 2005/0150390 A1 * | 7/2005 | Schifferle | B65D 85/8043 | 99/295 |
| 2006/0130665 A1 * | 6/2006 | Jarisch | A47J 31/3638 | 99/279 |
| 2006/0174769 A1 * | 8/2006 | Favre | A47J 31/0668 | 99/275 |
| 2006/0225575 A1 * | 10/2006 | Denisart | A47J 31/3695 | 99/275 |
| 2009/0126577 A1 * | 5/2009 | Ternite | A47J 31/0673 | 99/295 |
| 2010/0083843 A1 * | 4/2010 | Denisart | A47J 31/3695 | 99/295 |

(56) References Cited

U.S. PATENT DOCUMENTS

2010/0107889 A1* 5/2010 Denisart ............ A47J 31/3695
99/295

FOREIGN PATENT DOCUMENTS

| EP | 1477092 | 11/2004 |
|----|---------|---------|
| EP | 1486150 | 12/2004 |
| EP | 1593329 | 11/2005 |
| EP | 1669011 | 6/2006 |
| FR | 2842089 | 1/2004 |
| WO | 9743937 | 11/1997 |
| WO | 02080744 | 10/2002 |
| WO | 03059778 | 7/2003 |
| WO | 2004026091 | 4/2004 |
| WO | 2006003115 | 1/2006 |
| WO | 2006014936 | 2/2006 |
| WO | 2006023309 | 3/2006 |
| WO | 2006066624 | 6/2006 |
| WO | 2006082064 | 8/2006 |

OTHER PUBLICATIONS

Krups Amazon.com Product Review, http://www.amazon.com.de/product-reviews/B000IWJ801?pageNumber+2, Aug. 24, 2011 (6 pages).

\* cited by examiner

DEVICE FOR PREPARING A LIQUID BEVERAGE FROM A CARTRIDGE

PRIORITY CLAIM

This application is a divisional application of U.S. patent application Ser. No. 12/530,057, filed on Sep. 4, 2009, which is a National Stage of International Application No. PCT/EP2008/051828, filed Feb. 15, 2008, which claims priority to European Application No. 07103610.7, filed Mar. 6, 2007, the entire contents of which are being incorporated herein by reference.

BACKGROUND

The present invention relates to a device for preparing a liquid beverage from a cartridge. In particular, the invention relates to the preparation of hot or cold drinks from cartridges containing one or more food ingredients.

Numerous types of system for preparing drinks from cartridges exist. The way in which the cartridge is inserted into the machine preferably needs to be fairly direct, free of complications, and allow the cartridge to be moved easily after use.

The problem with some systems comprising cartridge support means incorporated into the machine stems from the fact that it is difficult to prevent any contact between the drink and the machine. These systems are ill-suited to multi-drink use because of the frequent contact between the drink and the cartridge support means. This then presents problems of cross-contamination and of hygiene, particularly with certain ingredients, such as milk.

Some systems therefore exist which comprise a removable cartridge holder, that is to say a cartridge holder that can be detached from the remainder of the device in order to solve these problems. Another advantage of this is that the cartridge can be disposed of more easily, particularly when it remains full of liquid after extraction. This then prevents cartridges that still contain liquid from being stored in the machine. It also makes the cartridge easier to replace and therefore makes it easier to rinse or clean the cartridge holder, for example, in a dishwasher.

Patent application WO 2006/082064 describes a device with a removable cartridge holder comprising an injector. The injector can be positioned at various locations relative to the surface of the cartridge and this makes it possible to optimize the flow of fluid within the cartridge and thus, for example, encourage the dissolving or dispersion of certain ingredients. A system such as this is still relatively complicated, however, and requires a good fit between the fluid unit of the machine and the injector belonging to the cartridge holder at the time of connection. The accuracy of the fit is awkward to achieve and may be adversely affected over the course of use of the system. The system may also present a problem that, when the cartridge is pressurized, delamination may arise in the region where the membrane that forms the injection surface is sealed against the edges of the body of the cartridge. A phenomenon such as this may be associated with the lack of clamping of the sealed joint by the injector support connected on the cartridge holder side where the clamping forces transferred by the support onto the edges of the cartridge are lower.

The other existing devices are unable to solve all the problems raised in relation to patent application WO 2006/082064.

Patent application EP 1 153 561 A1 relates to a device with a movable drawer and an injection unit which is lowered in a combined rotational and translational movement. The device comprises a single central piercing element and there is no choice as to where the piercing element is positioned. The cartridge support is able to move translationally but is not detachable from the device and therefore entails manipulation or an ejection system in order to allow the cartridge to be removed.

US patent application 2003/066431 relates to a coffee machine with a movable drawer. The movable drawer is not detachable here either. The injection unit may be a pivoting support comprising an injection spike which is folded down onto the top of the cartridge. However, the device does not anticipate sealed clamping between the cartridge and the injection unit which would allow high extraction pressures to be applied to the cartridge. A machine such as this is therefore essentially designed for low-pressure percolation use.

U.S. Pat. No. 3,260,190 relates to a coffee machine using cans comprising a detachable drawer which is inserted by sliding along rails. A system of levers allows the can-piercing means to be brought closer and engaged. These piercing means lock the can in the operating position.

Patent application WO 97/43937 relates to a removable adapter to accept a measured dose of coffee which is inserted under a hot water distributor by means of a bayonet-type rotary system in a sealed configuration.

Patent application US 2003/0071056 relates to a machine for dispensing drinks comprising a drawer into which there is fitted a can which is pierced by a movable injector, at the same time sealing directly around the can.

Patent application EP 1477092 relates to an appliance for dispensing drinks which comprises a drawer intended to accept a single serving pack for preparing a drink, which pack is slid into an operating position and secured in this operating position by locking means activated by the pressure exerted by the drawer at the time of insertion and which are situated at the end of the drawer.

Patent application EP 1 486 150 A2 relates to an appliance for dispensing drinks at low pressure comprising a drawer able to move in an injection unit in order to accept a can and associated with a can-ejection device. The injection unit comprises an injector able to move linearly and which is lowered to pierce the can. The drawer is immobilized by retaining means transversely locking it in order simply to prevent it from being removed. In the case of high internal pressures there is a risk of delamination along the sealing edges of the cartridge, because of the lack of clamping.

Patent application WO 2006/066624 relates to an appliance for preparing drinks from a pack comprising a pack support comprising an opening to accept the pack and a cover element to close the opening; closure means being provided and designed to move the pack support in a translational direction from a position in which the opening in the support is open into a position in which this opening is closed; the support being moved more particularly upwards by gear and crank means.

Most of the devices of the prior art are ill-suited to withstanding high pressures. Some devices which may be suited to high pressure still run into difficulties with sealing, lack of clamping, and mechanical complexity, these difficulties being associated with the need to produce a joint with the injection system which is both sealed and clamped firmly enough that it avoids any accidental removal of the cartridge holder or alternatively avoids any accidental delamination of the cartridge. The problem of high-pressure delamination may lead to steam or boiling water being splashed, or may even cause the cartridge to burst.

What is more, in most of the systems of the prior art, the cartridge is held clamped in the device usually by compression of the sealing means. In order to avoid any risk of accidental removal of the cartridge support, particularly where this is detachable, during the pressurizing mode, it is essential that this be clamped firmly enough in the device. Firm clamping on the sealing means itself may cause the cartridge to become crushed if the clamping is applied to the cartridge itself, or alternatively may cause fairly rapid deterioration of the sealing means and therefore of the sealing conditions. Another problem is that the injection fluid may partially cover the external surface of the cartridge if sealing is performed around the edges of the cartridge, and this is not very hygienic.

SUMMARY

It is an object of the present invention to provide a solution to these problems.

The invention provides a solution to the problems and affords advantages associated with:—arranging the injection means more directly with the cartridge and affording greater simplicity and mechanical reliability,—freedom to choose the position of the injection point for "multi-drinks" use in order to be able, for example, to encourage better dissolving of certain ingredients in the cartridge,—an arrangement affording better sealing of the cartridge in the pressurized mode so as to favour the methods of extraction, percolation, dissolving and/or foaming,—an arrangement that reduces the risks that the cartridge will burst or delaminate and which therefore affords the user greater safety, and—better hygiene with reduced contact between the liquid and the external surfaces of the cartridge or the surfaces of the cartridge holder.

To achieve that, the invention is based on a first general principle that consists in providing a cartridge holder of simpler design, that is to say that does not have its own injection means, which is inserted into the device in an insertion position, followed by means for injecting fluid into the cartridge which are supported entirely by the fluid supply unit of the device and which are able to move into engagement with the cartridge; the sealing means being then provided in association with the injection means so as to produce direct sealing between the injection means and the cartridge, and separate clamping of the sealing means by means that clamp the cartridge and the cartridge holder firmly enough with respect to the injection unit that the cartridge can withstand the pressure and in particular set aside the risks associated with delamination of the cartridge.

More particularly, the invention relates to a device for preparing a liquid beverage from a cartridge, comprising: a supply unit for supplying injection fluid to the cartridge, a cartridge holder configured to accept and support a cartridge; the said cartridge holder being detachable from the rest of the device, complementary insertion means configured to allow the cartridge holder to be inserted from its detached position; injection means being provided through a support that forms part of the supply unit; the said injection means being able to move into engagement relative to the cartridge contained in the cartridge holder. An elastic sealing means is provided in association with the injection means to provide sealing at least locally and directly between the said injection means and the injection surface of the cartridge. Clamping means are also provided to apply a clamping force clamping the supply unit against the edges of the cartridge holder and/or edges of the cartridge.

According to one possible feature of the invention, the clamping means comprise a clamping portion of the injection support, which portion is intended to engage, upon clamping, at least with an axial compression component, with an edging of the cartridge which is intended to rest on a bearing edge of the cartridge holder.

The clamping portion of the clamping means and the bearing edge of the cartridge holder preferably form, with the edging of the cartridge, a clamping surface that is substantially circumferential and continuous.

As a preference the clamping surface is positioned in such a way that it fits at least on the extremities of the sealing edging of the injection wall of the cartridge so that any possible delamination of the said cartridge seal under the effect of pressure is prevented or, at the very least, the risk of such delamination is reduced.

The pressure exerted by the elastic sealing means against the cartridge is preferably an essentially axial sealing pressure obtained by compressing the elastic sealing means onto the injection surface of the cartridge. The pressure achieved by the sealing means is exerted at least over that part of the injection surface that lies immediately around the injection point.

According to one principle of the invention, the clamping function performed on the edging of the cartridge and against the cartridge holder and the sealing function of sealing against the cartridge are separate. Thus, it also becomes possible to perform sealing over a flexible part of the cartridge such as over the upper membrane thereof without in any way tearing this, at least beyond the opening needed to inject the fluid into the cartridge and to clamp efficiently against a more rigid part of the cartridge, particularly against its sealing edging. Sealing thus may be obtained without undue force and, at least in part, using the forces exerted within the cartridge as a result of the pressure of the fluid in the cartridge. In particular, when the cartridge has a flexible injection wall, such as a flexible membrane, this is driven toward the sealing means surrounding the injection means.

It will therefore be understood that the clamping forces can be tailored to achieve effective clamping that avoids the problems of delamination but without being excessive because the sealing can be achieved partially using the pressure of the fluid in the cartridge.

According to one possible embodiment, the elastic sealing means extends over an area of the injection support that is intended entirely to cover the injection surface of the cartridge. As a result, not only is sealing achieved locally around the injection point but it is also achieved over the entire injection wall of the cartridge. The advantage of this is that sealing is ensured even on defective cartridges, for example, ones which have become accidentally perforated in the cartridge injection wall, something which may happen when the wall is a membrane that can be punctured.

According to one possible embodiment, the elastic sealing means also extends into the clamping portion of the injection support for clamping against the edging of the cartridge and/or of the cartridge holder. As a result, during the clamping using the elasticity afforded by the said elastic means it is possible to compensate for the mechanical play of the clamping parts of the device and for variations due to the dimensional tolerances on the edging of the cartridge.

According to one possible embodiment, the injection support also comprises a raised engagement portion designed to drive a flexible wall of the cartridge toward the inside of the cartridge. As will be explained later on, an arrangement such as this serves to reduce the risk of resurgence or sudden squirting of pressurized liquid through the cartridge upon disengagement of the injection means from the cartridge.

According to one possible embodiment of the invention, the injection means are preferably able to move in a straight path. A configuration such as this allows a good association of the injection means with the cartridge and makes it possible to achieve sealing by better control, for example, of the dimensions of the injection point(s) made in the cartridge.

In this case, the injection means are moved in a straight direction substantially perpendicular to the injection surface of the cartridge.

According to one aspect of the invention, in order to improve the dissolving and/or the wetting of the ingredients contained in the cartridge, the injection means are located in a region offset from the central axis of the opening of the cartridge holder to accept the cartridge. Thus, the fluid may flow more vigorously in the cartridge with greater turbulence than could be achieved were it installed centrally or by comparison with an installation comprising several injection points distributed uniformly over the injection surface of the cartridge.

The injection means may be formed of at least one injection spike secured to the injection support. According to a preferred embodiment, a single injection spike is used to inject pressurized fluid through the wall of the cartridge. The advantage of this is that it requires only a low puncturing force unlike multi-spike injection means, and this is therefore an advantage particularly when puncturing the walls of capsules containing puncture-resistant polymers. The injection surface may also be punctured cleanly by the spike and the fluid is injected directly into the cartridge through the spike or against the surfaces of the spike. An arrangement such as this also makes it possible to restrict the region that has to be sealed because of the isolated nature of the injection. As a preference, the injection spike projects from the engagement surface of the injection support to penetrate the cartridge by engagement of the surface of the injection support with the cartridge.

As a preference, a liquid-carrying duct passes through the injection spike. The orifice of the duct may be positioned along the axis of the duct or may be inclined slightly so as to direct the jet toward the bottom of the cartridge but offset from the centre. A device such as this makes it easier to achieve sealing around the injection means, and more precisely around the duct. However, it is possible to conceive of a liquid-carrying duct and of a spike which are positioned separately and of a sealing means surrounding both the spike and the fluid inlet into the cartridge.

The elastic sealing means may be rendered elastic by shape and/or by the material of which the said means is made.

The local elastic sealing means is preferably a means made of an elastomeric material.

The local sealing means is preferably a ring of elastic rubber or silicone surrounding the base of the said injection spike.

The local sealing means may be an external layer fully or partially covering the injection support.

In one possible alternative, the elastic sealing means may form an integral part of the injection surface of the cartridge.

As a preference, the surface of the cartridge on which the sealing means is arranged is also flexible. It may advantageously be a puncturable membrane. The flexibility may make it possible to compensate for play and surface irregularities and thus improve the efficiency of the seal.

In general, the complementary insertion means belonging to the cartridge holder and to the fluid supply unit comprise ribs and guide grooves to allow the cartridge holder to be inserted by sliding it into the fluid supply unit.

The injection means and the movable support may be fixedly attached together and therefore moved as one.

According to a first possible embodiment, the movable support is moved in a straight path without axial rotation. The means of actuating the movable support may be arranged in such a way as to guide the movable support substantially linearly and without any rotational movement. The advantages are that they ensure that the injection means engage against the cartridge precisely and that a local seal can thus be achieved which is able to withstand the pressure obtaining in the cartridge. A configuration such as this also provides a choice as to the relative positions of the injection means with respect to the injection surface of the cartridge, this in particular being offset.

According to another embodiment, the support is able to move in a curved path comprising both an axial component and a rotational component. In particular, the movable support is articulated about a pin substantially parallel to the transverse plane of the said movable support and is situated to one side of the said support. The pin can also be moved translationally in a longitudinal direction. The amplitude of the longitudinal movement may be short, of the order of 5 to 20 mm. For example, one edge of the movable support may be articulated by articulation means to a fixed base part of the supply unit about a pivot pin capable of translational movement in at least one slot formed in the base part. An advantage of a configuration such as this is that it allows a more tolerant fit between the injection support and the cartridge holder and also makes it possible to reduce the number of parts.

According to one embodiment, the injection support is able to move with respect to a fixed base part of the supply unit. In this case, the injection means are mounted for example fixedly on the support which support is able to move relative to the cartridge and to the cartridge holder once in the insertion position.

The movable support is generally associated with means for clamping the movable injection support, these being designed to move the injection means relative to the cartridge holder which is fixed in the position in which it is inserted in the base part, from a position some distance from the injection means, allowing the cartridge holder to be inserted in the supply unit beforehand, to an injection position by moving the injection means closer against the cartridge and/or the cartridge holder and thus allow the injection means to engage with the cartridge.

According to one feature, the complementary insertion means allow the cartridge holder to be inserted into the supply unit in a linear direction separate from the direction of travel of the movable support or of the injection means.

This direction of insertion of the cartridge may advantageously be slightly inclined with respect to the horizontal plane and in such a way as to incline the injection wall of the cartridge and position the injection point on that part of the injection wall of the cartridge that lies at an appreciably higher level relative to the centre of the cartridge. One advantage is that it reduces the risk of resurgence of pressurized liquid at the time of disengagement by keeping the injection point above the level of the liquid remaining in the cartridge. Thus, the means of inserting the cartridge holder may be configured such that the cartridge holder can be inserted in the supply unit at an angle of inclination ranging between approximately 2 and 25 degrees, preferably between 5 and 10 degrees. However, in order also to avoid any fluid running out of the cartridge under gravity when the injection means is disengaged from the cartridge, the angle should not be too great.

In a preferred embodiment, the actuating means comprise a toggle lever or a cam actuated by a manual lever or a motor.

According to another embodiment of the invention, the injection means are actuated directly by a movable lever that can be rotated on a base part of the supply unit. The injection means form part of a support element which is guided in its movement by the base part. Thus, rotational movement of the lever moves the injection means. The movable lever can be locked against the base part when the injection means are locked to the cartridge in the injection position.

According to one embodiment the base part and the cartridge holder comprise complementary insertion means designed to lock and clamp the cartridge holder in the insertion position through the effect of the pressurized fluid being injected into the cartridge. More specifically, the base part and the cartridge holder comprise complementary wedge-like means which are designed to keep the cartridge holder firmly in the insertion position under the combined effect of the friction forces exerted by the complementary means and of the internal pressure exerted in the cartridge as a result of fluid being injected into the cartridge. In other words, the complementary insertion means form clamping means and are "self-locking" under the effect of the injection pressure. A configuration such as this simplifies the mechanical device and offers greater safety by preventing any possibility of the cartridge holder being disengaged while a certain pressure is being applied to the system.

According to one feature, the supply unit is open at the bottom to accept the cartridge holder which extends by way of a free wall(s) portion to support the cartridge toward the service region and to allow the liquid to flow out from the cartridge without touching the device beyond the cartridge holder. Thus, according to the way in which the cartridge holder is arranged in the device, it is possible for liquid to flow directly from the cartridge without touching any non-detachable surface of the device. According to one configuration of the cartridge holder, the cartridge holder comprises a shell to accept the cartridge, ending in at least one opening, positioned at the bottom of the said shell. The opening is made large enough to avoid any contact with the liquid delivered and possible splashes associated with turbulence when the liquid is being delivered through the cartridge.

According to another aspect of the invention, the movable injection support may comprise at least one engagement portion forming a non-intrusive raised surface separate from the injection spike intended to engage with the injection surface of the cartridge so as to drive it to the inside of the cartridge by simple deformation and thus reduce the internal volume of the cartridge. The term "non-intrusive" is to be understood as meaning a surface portion which does not form an opening in the cartridge. As a preference, the surface of the cartridge is a readily deformable flexible membrane.

The volume gained by the engagement portion on that of the cartridge makes it possible to form a space that allows gases or a gas/liquid mixture to expand inside the cartridge as the movable injection support is removed upon re-opening of the device. The engagement portion of the movable support may, for example, be a convex surface portion.

According to the invention, the local sealing means is associated with the said injection spike. The term "local means" should be understood as meaning a means positioned near to the sealing spike in engagement with the surface of the cartridge around the spike so as to prevent liquid from escaping against the external surface of the cartridge. The means may extend to greater or lesser extent against the surface of the cartridge from the injection point. The local sealing means is preferably an elastic means able to compensate for the variations in separation and/or any possible play associated with the pressure exerted by the fluid on the surface of the cartridge. The sealing means may be a ring or an external surface coating of the injection support surrounding the base of the injection spike. The ring or coating may be made of an elastomeric material or of silicone. The sealing ring or coating may have a diameter ranging between about 1 and 8 cm.

According to one principle of the invention, the clamping means comprise a clamping surface portion of the injection support which acts on the edging of the cartridge and/or on the bearing edges of the cartridge holder. In a preferred embodiment, the edging of the cartridge bears against the bearing edges of the cartridge holder so that the clamping surface portion of the support compresses the edging of the cartridge. The cartridge edging usually comprises the portion where the injection surface is sealed on to the body of the cartridge; hence, clamping is applied to the sealing portion and thus prevents any risk of delamination when it is under pressure in the device.

The clamping means also comprise actuating means which are adjusted in such a way as to adopt a stable clamping position clamping the movable support against at least one surface of the cartridge. The actuating means comprise, for example, means involving a toggle lever, gears or a cam. The injection means are, for example, supported by a movable support associated with means of adjusting the thickness of the said support so as to set the stable clamping position and compensate for any possible play and dimensional tolerances there might be. The adjusting means may, for example, be a system of shims that allow the thickness of the movable support of the injection means to be adjusted.

According to another aspect, the invention relates to a method for reducing the resurgence of liquid or gas-liquid mixtures under pressure through at least one injection point in the injection wall of the cartridge. Resurgence is usually due to the raised pressure created when pressurized fluid is injected into the cartridge to prepare the liquid beverage.

There are, in fact, various ways of limiting resurgence, such as, for example, closing the injection point after injection using a valve or a material that acts like a valve.

However, the existing methods present certain problems. In particular, the addition of such a re-closure means is complicated to achieve and means that the injection point has to be located precisely and therefore forces the user to orientate the cartridge in just one precise position in space within the device. A solution that involves using a fabric or some other material the structure of which closes back up on itself also presents a problem of attachment to the cartridge, particularly when the injection wall is slender and flexible, as is the case with a membrane.

One of the objects of the invention is therefore to provide a simpler, inexpensive method that can be employed without modifying the structure of the cartridge.

One method of the invention is to free up enough volume in the cartridge to at least partially compensate for the volume of gas-liquid mixture which expands in the cartridge after the injection means have been disengaged from the cartridge or when the injection point is released by the said injection means.

According to a first embodiment, the method is to at least force a reduction in the volume of the cartridge before injecting the fluid into the cartridge and to re-establish the said volume once the fluid has been injected into the cartridge. Thus, use may be made of an engagement surface which deforms a flexible wall of the cartridge by way of preferred solution.

More specifically, the method involves: piercing an injection surface of the cartridge by moving an injection means relative to the cartridge, reducing an empty internal volume of the cartridge using an engagement surface which deforms a flexible wall of the cartridge.

According to this aspect of the invention, the device for preparing a liquid beverage from a cartridge, comprises: a supply unit for supplying injection fluid to the cartridge comprising an injection support comprising injection means for injecting injection fluid into the cartridge, a cartridge holder configured to accept and support a cartridge; and which is designed to close against the supply unit, characterized in that the supply support comprises an elastic sealing means to seal at least locally around an injection spike and a raised engagement surface able to drive a wall of the cartridge toward the interior of the cartridge and thus reduce the internal volume of the cartridge.

As a preference, the engagement surface is convex and spaced away from the injection spike.

According to another possible method of the invention, the method consists in keeping a certain volume of gas and/or of air both inside the cartridge and around the injection point on the inside of the cartridge while the pressurized fluid is being injected. Thus, when the injection means are removed, the gas or the air contained in the cartridge escapes through the injection point and the cartridge returns to atmospheric pressure without the liquid being able to escape from the cartridge.

To achieve that, one solution involves keeping the injection surface of the cartridge in an inclined position by positioning the injection point on that part of the inclined surface that lies highest up relative to the centre of the said surface and disengaging the injection means from the cartridge while keeping the cartridge in that same inclined position.

As a preference, the injection surface is inclined by an angle of between 3 and 25°, preferably between 5 and 10°. The small angle also makes it possible to prevent any liquid that may still be present in the cartridge from running out, particularly when the cartridge holder is being removed from the device. The surface is also preferably a puncturable flexible membrane. A membrane that is said to be "flexible" is to be understood to mean a plastic wall and/or a metal foil or a plastic and metal laminate which is not self-supporting as such.

One way of keeping the cartridge inclined in order to keep a volume of gas and/or air near the injection point is obtained using a detachable cartridge holder directed and guided translationally in the way described in this application.

The invention also relates to a cartridge holder thus intended to be inserted into a fluid supply unit to prepare a liquid from a cartridge containing at least one food substance.

The cartridge holder comprises:—a housing to accept a cartridge,—a handle,—a free end,—means of insertion in the supply unit comprising at least two ribs and/or guide grooves,—a bearing edge, characterized in that it comprises a protection means protecting against splashes of liquid from the housing toward the handle.

In particular, the protection means forms at least one wall portion designed to stand up between the bearing edge and the handle. The bearing edge may be intended to act as a support for an edging of the cartridge so as to allow it to be clamped in the device as explained previously.

Most specifically, the protection means is a bowed portion which extends at right angles to the plane of the bearing edge. The bowed portion may have a height of about 5 to 10 mm.

BRIEF DESCRIPTION OF THE DRAWINGS

Further features and advantages of the present invention will become apparent from reading the description which will follow, given by way of nonlimiting example with reference to the attached drawings, in which.

DETAILED DESCRIPTION

Figure 1:
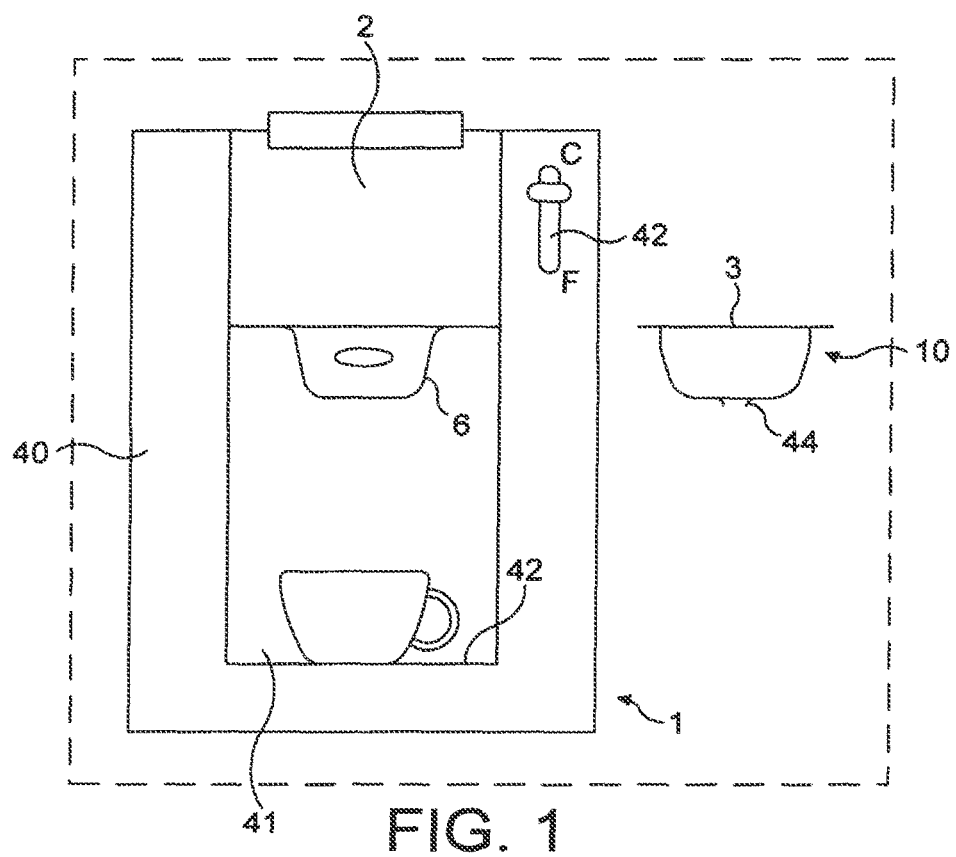
FIG. 1 is a simplified overall view of a liquid preparation system according to the invention.
Figure 2:
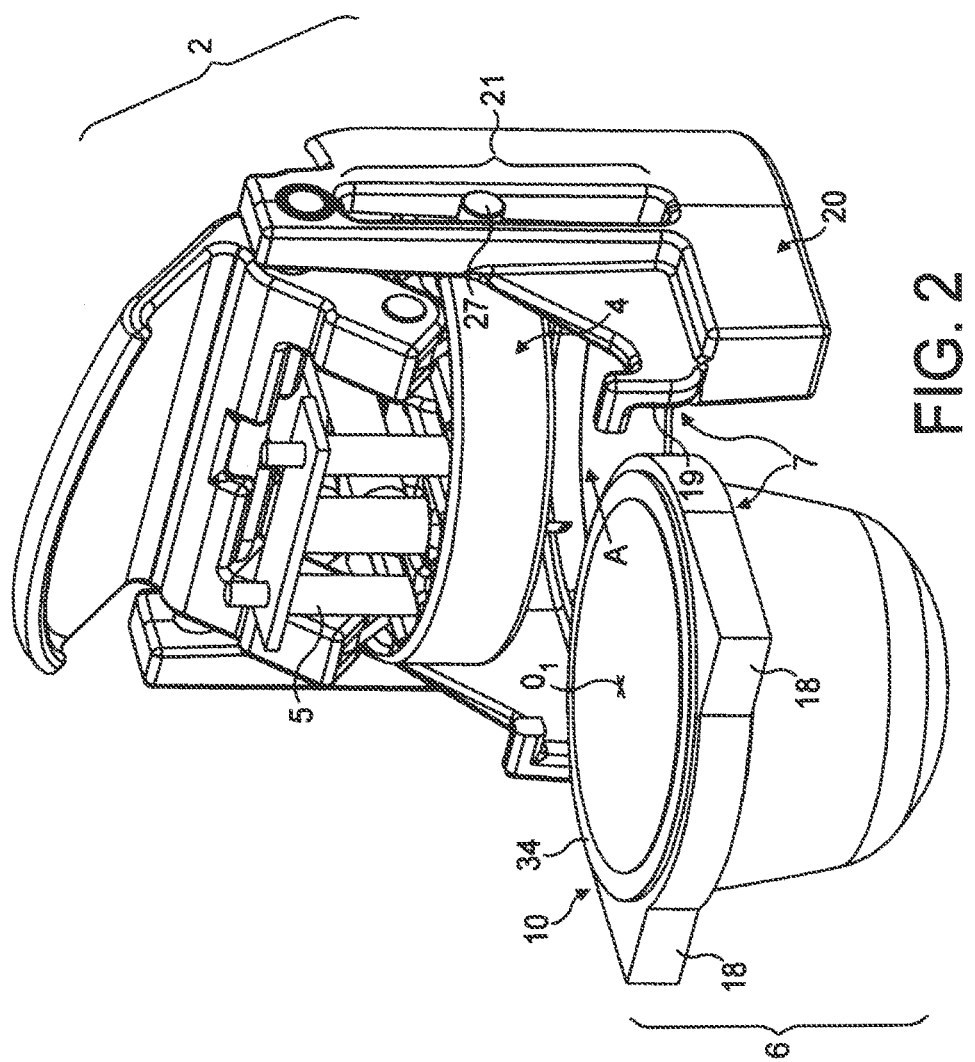
FIG. 2 shows a perspective view of the device according to a first embodiment, particularly of the supply unit in the open position and of the cartridge holder in the detached position.
Figure 3:
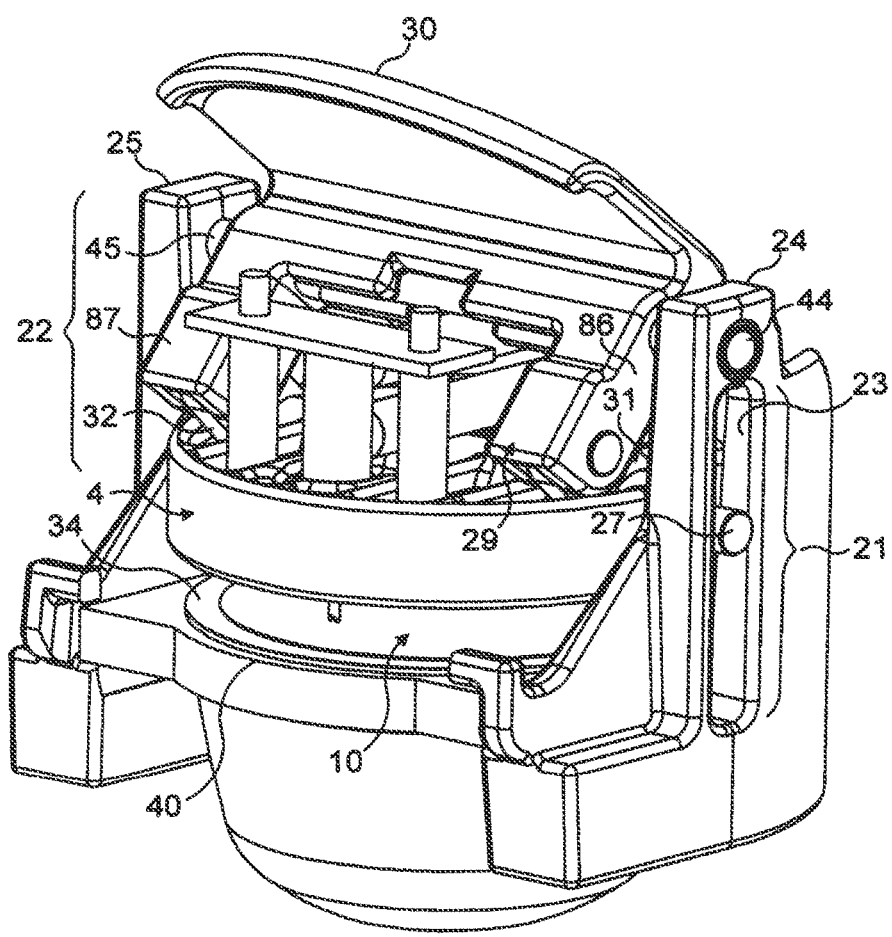
FIG. 3 shows a perspective view like in FIG. 2, but with the cartridge holder in the insertion position and the supply unit in the open position.
Figure 4:
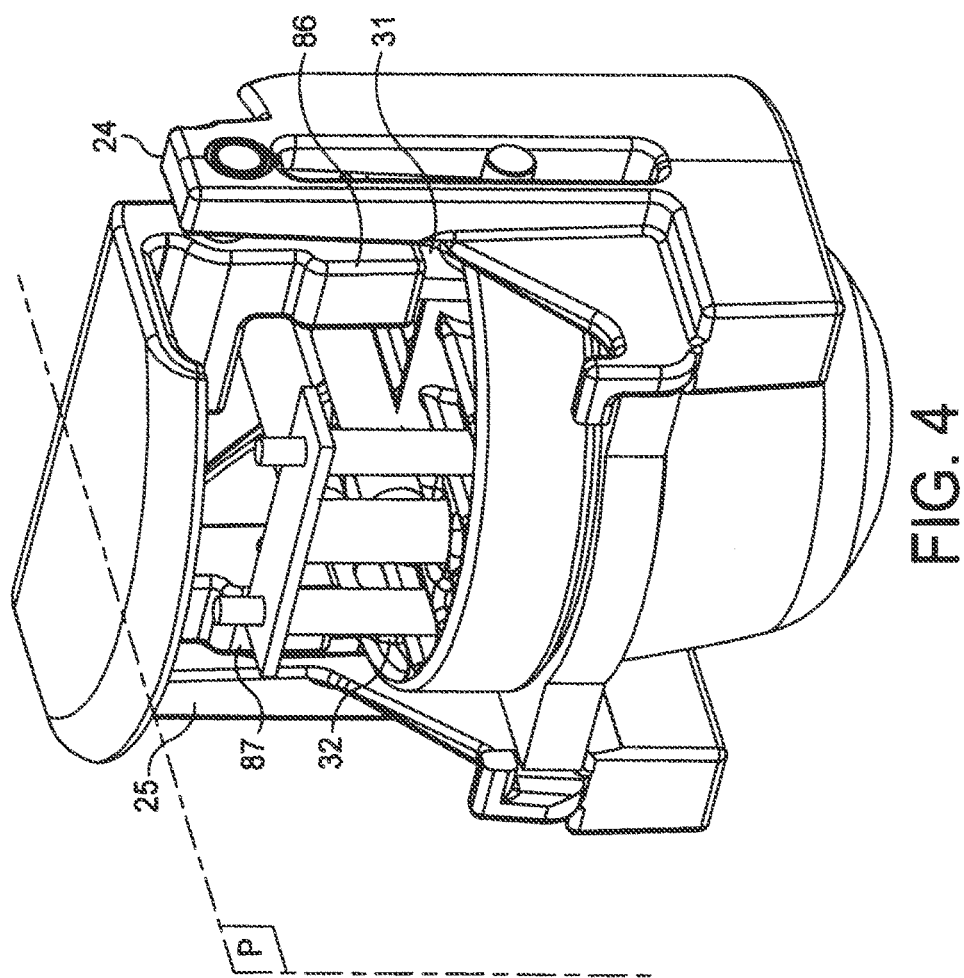
FIG. 4 shows a perspective view like FIGS. 2 and 3, with the supply unit in the closed position, that is to say in the injection position.

FIG. 1 shows, in simplified form, a system for dispensing liquids prepared from cartridges comprising a device or appliance 1 and cartridges 10 suited to the said device. The liquid may be a hot or cold drink such as coffee, cappuccino or tea or some other food preparation such as sauce, soup or the like.

Each cartridge contains one or more food ingredients in solid, liquid, gel or paste form. It may, for example, contain roasted ground coffee powder, instant coffee powder, milk powder or liquid concentrate, cocoa, or tea in leaf or soluble form.

The cartridge is advantageously of the type described in EP 1472156B1. In particular, the cartridge may comprise an injection wall 3 in the form of a flexible membrane through which the fluid (that is to say a quantity of hot or cold water) is injected from the supply unit and a duct 44 intended to guide the prepared liquid directly into the cup. The membrane may be attached to a sealing edge of the body of the cartridge. The cartridge may comprise an airtight internal chamber containing the ingredients. The chamber can be punctured under the effect of the rise in pressure of the fluid injected into the chamber in order to allow the prepared liquid out. Puncturing may be done using puncturing means specific to the cartridge in association with at least one internal membrane of the chamber. Puncturing may be performed by deforming the internal membrane against the puncturing means until the rupture tension of the membrane material is reached. One advantage of the cartridge is that extraction, dissolving or percolation can be performed under a controlled pressure, of the order of 5 to 20 bar, inside the cartridge by delaying the flow of the ingredients and by improving the interaction of the ingredients with the pressurized fluid. This principle makes it possible to create more froth than can be achieved with low-pressure percolation methods. Another advantage is that it is possible, at the same time, to limit the contact between the liquid and the device as described in patent EP 1472156B1. Of course, the invention is not restricted to the use of the cartridge according to that patent. For example, the membrane and the opening means may be replaced by a filter element, for example, such as a paper and/or plastic filter and a filter support comprising collection channels and/or openings for distributing the liquid.

In this description, the term "injection fluid" relates essentially to hot or cold water or alternatively to a mixture of water and air.

The device may comprise a support structure 40 in which a pressurized fluid supply unit 2 is mounted and comprises a cartridge holder 6 that can be detached from the device. Arranged under the cartridge holder is a serving area 41 which, for example, comprises a cup support 42. The device also comprises a reserve of water such as a removable tank, associated with a pump, a water heater and a fluid circuit to supply the fluid supply unit 2 with hot and/or cold water as required. The device also comprises a reasonably sophisticated control means allowing the user to select, from a pre-established range of choices, one or more options for the preparation of hot and/or cold preparations and/or a number of sizes of drink to be dispensed. The control means may be associated with a controller which selectively controls the switching-on of the pump, of the water heater and of (a) valve(s) associated with the fluid circuit. The control means may be a means of the lever type or one or more control buttons.

FIGS. 2 to 6 show a first embodiment of the device according to the invention. The cartridge holder 6 and the pressurized fluid supply unit 2 comprise complementary insertion means 7 configured to allow the cartridge holder 6 to be inserted into the unit in a preferred direction A. The means 7 are such that the cartridge holder can be detached from the device. The term "detachable" means that the cartridge holder is not connected to the device and, in particular, to the supply unit 7 by any permanent means of connection when in its "detached" position and can be carried around at will so that its cartridge can be emptied out once this cartridge has been used so that it can be reloaded with a fresh cartridge 10. The cartridge holder can thus be rinsed or cleaned easily in order to remove any food remains from its surface.

However, the invention may also relate to a cartridge holder that cannot be detached from the device or from the supply unit but which can be inserted into the supply unit from a drawer open position. A "drawer open" configuration means that the travel of the cartridge holder is halted, while it is being slid open, by stop means to allow a cartridge to be loaded without the need to remove the cartridge holder completely. It must be understood that the cartridge holder may also be arranged in such a way as to be able to adopt a drawer open position and be detachable if required.

The complementary insertion means 7 for inserting the cartridge holder into the supply unit may adopt various forms. The complementary means are preferably arranged in such a way as to allow direct and substantially linear insertion of the cartridge holder into the supply unit simply by the user pushing on the cartridge holder in the direction of insertion A. The cartridge holder is positioned in a reference position in the supply unit prior to movement and with engagement of the injection means with the cartridge.

According to one possible practical embodiment, the insertion means comprise guide ribs 18 and guide grooves 19 formed to complement one another on, respectively, the sides of the cartridge holder 6 and the internal sides of the base part 20 of the supply unit. The said insertion means extend laterally and preferably in a direction that is substantially horizontal or slightly inclined with respect to the horizontal (for example, by just a few degrees).

On the same side as the fluid supply unit 2, the base part 20 is fixed to the device in a non-movable manner. Mounted on this base part 20 is an injection support 4 in the form of a disc which is able to move relative to the base part. The injection support known as the "movable support" in the remainder of the description according to this embodiment can be moved under the effect of actuating means 22 that form part of the clamping means along the base part and in a substantially linear movement without any rotation in this first instance. In a preferred configuration of this first embodiment of the invention, the path of the movable support is entirely linear.

The movable support 4 comprises injection means 5 which are preferably positioned offset from the central axis O of the movable support and from the centre O1 of the injection surface of the cartridge when the latter is in the injection position inside the device.

The purely axial and linear movement of the movable support causes the injection means to engage also axially and linearly with the cartridge. This arrangement encourages perfectly controlled puncturing or contact with the cartridge. In particular, when the cartridge is punctured by the injection means, the dimensions and the geometry of the orifice pierced in the cartridge by the puncturing means are better defined. It is therefore possible to guarantee localized sealing, that is to say sealing around the injection means between these and the surface of the cartridge. It is also possible to guarantee good pressure conditions inside the cartridge without any risk of leakage while at the same time keeping to a closure mechanism that is simple and occupies little space.

Figure 6:
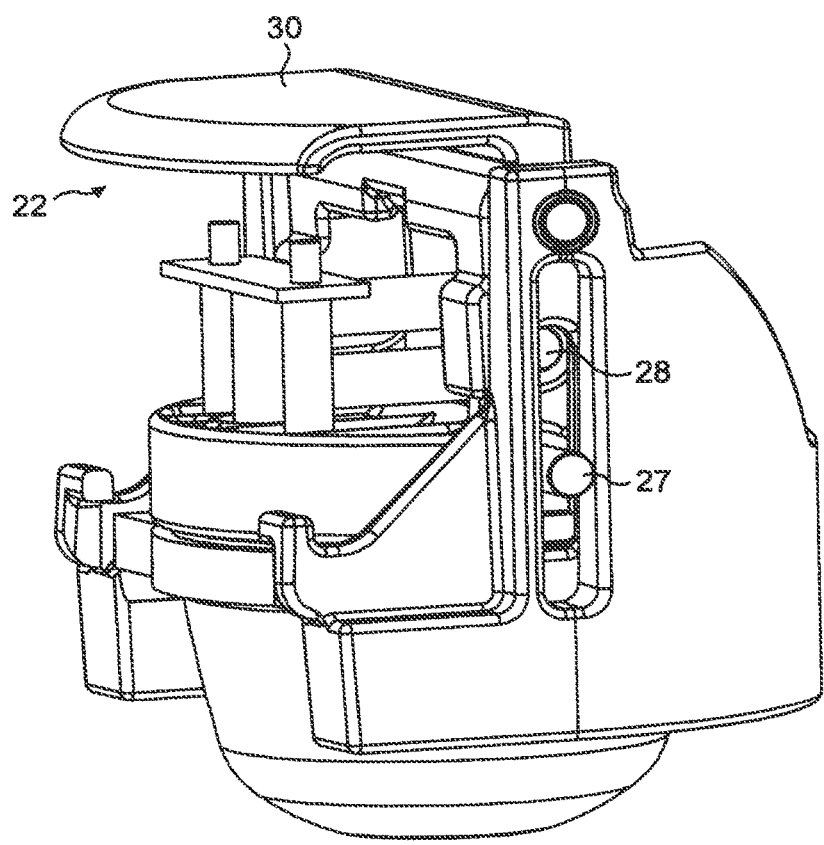
FIG. 6 shows another perspective view of a detail of the device.

The movable support 4 is thus guided in its movement in a vertical direction perpendicular to the direction of insertion of the cartridge holder 6 by translational guidance means 21. These means may comprise two guide grooves 23 formed along at least two branches 24, 25 of the fixed base part in which at least one rod, and preferably two rods, 27, 28, slide inside each groove 23 as shown by FIG. 6. The grooves are positioned substantially vertical along the branches. The rods 27, 28 may be replaced by a single boss of elongate shape positioned in the direction of the grooves.

Actuation of the movable support from its open position, that is to say its position away from the cartridge holder (FIG. 3) to its injection position (FIG. 4) is performed by an actuating system 22. There are various actuating systems that can be envisaged. According to the embodiment depicted, the actuating means is a toggle lever 29 associated with a manual lever 30. In an automated embodiment, the lever could be replaced by a motor. For preference, the actuating systems are situated vertically above the movable support and attached to the base part. More specifically, the lever 30 comprises two laterally spaced arms 86, 87 articulated, on the one hand to the end of the two branches 24, 25 of the fixed base part by two fixed pins 44, 45 spaced laterally apart and on the other hand, to a pair of arms 31, 32 of the toggle lever by two more movable pins 46, 47. The pair of arms 31, 32 is itself articulated to the disc-shaped movable support 4 by two pins extending outwards into the slots by the rods 27.

It should be noted that the actuating system 22 is preferably associated with an elastic return means (not depicted). The elastic return means may be associated with the lever and/or with the toggle lever in such a way as automatically to reposition the injection support in the raised position or away from the cartridge holder when no reaction forces are being exerted on the actuating means by the trapped edges of the cartridge allowing the support to be locked using the actuating and locking means. By way of example of an elastic return means, a spring is provided on the pivot pin 44 and/or the pin 45 to return the lever automatically to the raised position according to FIG. 2 when either the cartridge holder is absent or there is no cartridge in the cartridge holder.

Figure 5:
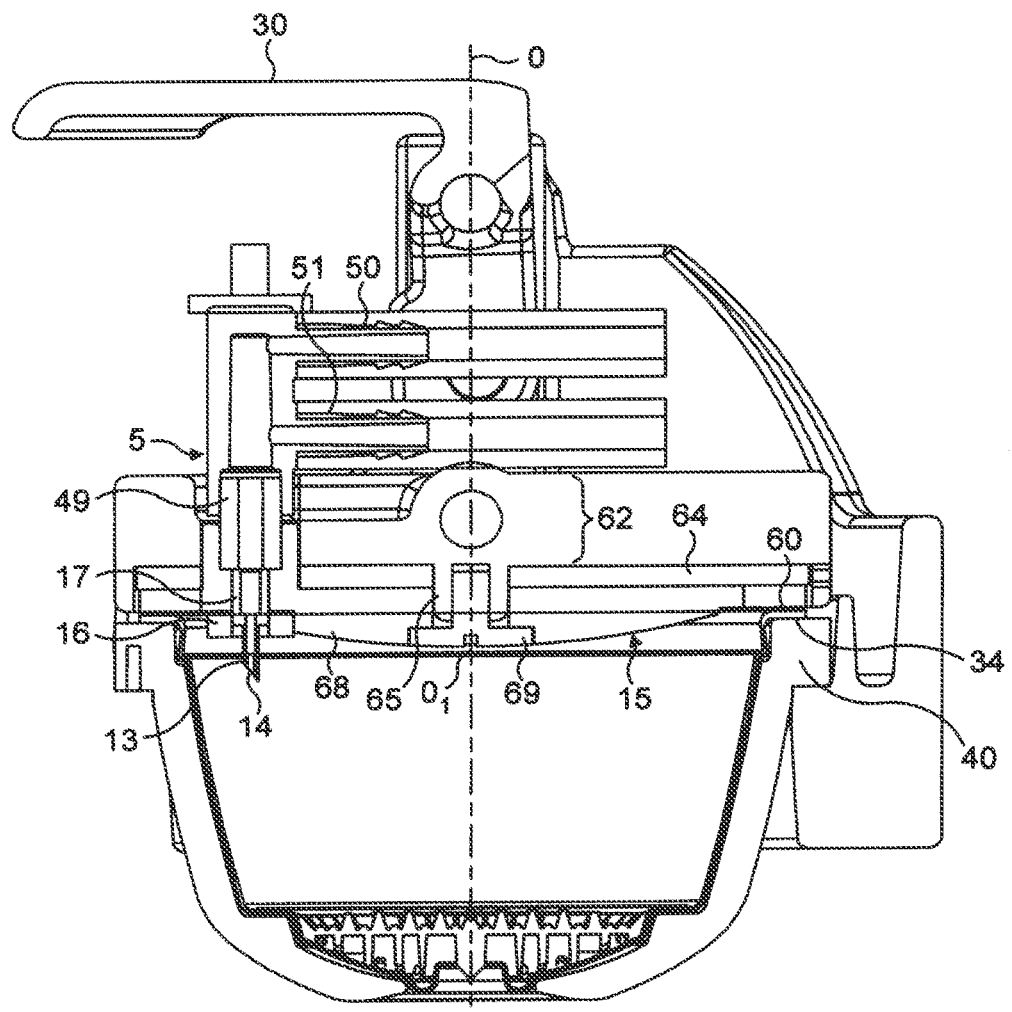
FIG. 5 shows a view in cross section on the plane P of FIG. 4.

FIG. 5 shows details of the fluid supply unit and of the way in which the cartridge holder is arranged in the injection position.

According to a preferred embodiment of the invention, the injection means 5 intrude into the cartridge. They may, for example, comprise an injection spike 13 secured to the movable support 4 which punctures the upper face of the cartridge. The spike has, passing through it, a duct 14 for conveying liquid into the cartridge. The injection spike is extended through the support and to the opposite side of the cartridge by one or more connectors 49. One of the connectors may comprise a branch into two separate inlets 50, 51 allowing the supply of a hot fluid and the supply of a fluid at ambient or at a cold temperature. The inlets are connected to flexible supply tubes which are themselves connected to the remainder of the fluid circuit. The selection of hot fluid or cold fluid with which to supply the injection means may be made using one or more valves (not depicted). As FIG. 5 shows, the injection spike ends in an orifice of small cross section, preferably smaller than 0.5 mm so that a jet of fluid can be directed at high velocity into the cartridge. For preference, the orifice is directed axially with respect to the duct 14 and toward the bottom of the cartridge. The offset position, the direction and the high velocity of the jet contribute to generating a turbulent flow of fluid inside the cartridge and is therefore aimed at improving the dissolving or dispersal of certain ingredients, even with cold water by way of injected fluid.

According to one option of the invention, sealing may be achieved on a restricted surface area, locally and around the point of injection through the surface of the cartridge or over the entire injection surface of the cartridge. This approach makes it possible, amongst other things, to reduce the mechanical force needed to allow the system to seal while at the same time withstanding high pressures (for example, of the order of 5 to 20 bar) inside the cartridge, and to reduce the mechanical complexity of the device. For local sealing, the injection means comprises a sealing means 16 in the form of an elastic ring surrounding the base 17 of the injection spike.

The sealing ring may be of a thickness ranging from 0.2 and 3 mm, preferably between 0.5 and 2 mm. Its diameter depends on the diameter of the intrusive portion of the injection spike. It is preferably 1.5 to 30 times the diameter of the injection spike, preferably between 2 and 15 times the diameter thereof. One or more circular grooves may be provided between the base of the spike and the sealing ring in order to improve sealing.

According to another possibility of the invention, sealing is performed over the entire surface of the cartridge. Provision is then made for the entire contact surface of the support 4, including the local region around the injection spike 13, to be made of an elastic sealing material such as an elastomer material or silicone. In this case, the ring 16 is replaced by the entire elastic structure of the underside of the support.

The sealing ring or, alternatively, the elastic underside of the injection support, may be made of an elastomeric material, of silicone, or of a plastic that has a low hardness and is elastically flexible. It must be understood that the injection face of the cartridge may also be flexible. The surface may, to start off with, be slightly convex because of the presence of gas contained in the cartridge and then deforms, in this case, partially under the effect of the axial mechanical pressure exerted by the sealing means 16. Sealing by compensating for play is achieved by association with the sealing means 16 and by deformation of the injection face of the cartridge. Deformation of the injection face occurs when the cartridge is pressurized by the injection fluid. Internal thrust forces are then created inside the cartridge and are directed toward the sealing means in order to press the surface 10 of the cartridge firmly against the said means.

By virtue of the sealing afforded by the ring 16 or the elastic surface of the support, the fluid injected under pressure through the injection spike is held directly at the base of the orifice made by the spike, or in close proximity thereto and cannot therefore re-emerge between the surface 10 of the cartridge and that of the movable support 4. This also reduces the surface areas of the device in contact with the liquid thereby preventing the possibility of any liquid rising back up. The system is also thus rendered leaktight with respect to the cartridge holder and is so independently of the actual clamping of the cartridge holder in the device.

According to a feature already mentioned, the movable injection support 4 and its injection means can be locked in the injection position by the clamping means, in particular the actuating system 22 on a clamping portion 60 when the cartridge holder contains a cartridge and the cartridge holder is inserted in the fluid supply unit. The movable support 4 comprises a clamping surface portion 60 which bears on an edging 34 of the cartridge. The edging 34 itself rests against bearing or clamping edges 40 of the cartridge holder. The edging is therefore trapped between the portion 60 and the edges 40 of the cartridge holder. The actuating means, particularly the toggle lever actuated by the lever therefore exert compressive clamping forces which are transmitted by the movable support 4 to the edging of the cartridge. The locking of the toggle lever achieved by pivoting it through its "stiff" point occurs when a cartridge is therefore present in the cartridge holder thus creating the additional thickness needed to force the toggle lever through its "stiff" point and thus obtain a stable support clamping position. This clamping is important to ensuring safety in the immobilizing of the cartridge holder in the method of operation in which pressurized fluid is introduced into the cartridge. The clamping also plays a part in holding the edging 34 around which the membrane 3 is sealed to the body of the cartridge firmly without the risk of its membrane 10 delaminating from the edging of the body of the cartridge.

According to one possible embodiment, if there is no cartridge or cartridge holder present, the lowering of the movable support 4 by means of the lever acting on the toggle lever does not give rise to this bearing effect and therefore does not generate enough reaction forces on the toggle lever. Because there is an elastic return means associated with the lever and/or the toggle lever, the lever pivots in the direction of re-opening, thus causing the toggle lever to rise back up when the user is no longer bearing down on the lever. It is therefore impossible to keep the movable support in a stable lowered position when the cartridge holder has been removed or when the cartridge has not been engaged in the cartridge holder. The latter is therefore returned to the open position, thus allowing the cartridge holder to be taken out or the cartridge holder to be inserted with its cartridge in the device.

In another possible embodiment, even when there is no cartridge present in the cartridge holder it is still possible to clamp the movable support 4 against the cartridge holder in a sealed manner. Sealing is afforded by applying the clamping surface 60, preferably made of a flexible material (an elastomer or equivalent) against the upper edges of the cartridge holder. One advantage then is that the device can be closed even if no cartridge is present in the device so that everything can be cleaned. The cartridge holder in this case protects the user from any splashing of boiling water during cleaning.

According to one principle of the invention it will be understood that the clamping forces applied to the cartridge holder in the supply unit are not borne directly by the sealing means acting around the injection spike. This is an advantage because the sealing function is separated from the function of clamping the cartridge holder in the unit; the latter function is intended to prevent any possibility of disengaging the cartridge holder while the device is under pressure. This also makes it possible to seal onto a flexible part of the cartridge and as close as possible to the injection point without the risk of rupturing the injection surface of the cartridge, particularly when this surface is a flexible membrane. It then follows that the sealing means is also not as heavily stressed in terms of compression and therefore retains its resilience and therefore sealing properties for longer.

Of course, the means of actuating and locking the movable support could be of a kind other than a toggle lever. They could involve a cam or a series of gears.

The thickness of the movable support may be adjusted by adjusting means. Adjustment may be necessary to ensure that the actuating means work correctly bearing in mind the phenomena of wear, tolerances, possible expansion due to heat, on the various components that make up the system, namely the cartridge and the device itself. Adjustment makes it possible, for example, to adjust the switching force needed to switch the toggle lever through its "stiff" point. The adjusting means allow the force with which the actuating means close to be adjusted and therefore influences the force exerted by the injection means on the surface of the cartridge in order to ensure good sealing under high-pressure conditions in the cartridge. The adjusting means allow the user's perception of closure to be adjusted as finely as possible. The user has thus to be able to perceive that the device is correctly and safely closed, but this has to be able also to be done without undue force.

Figure 7:
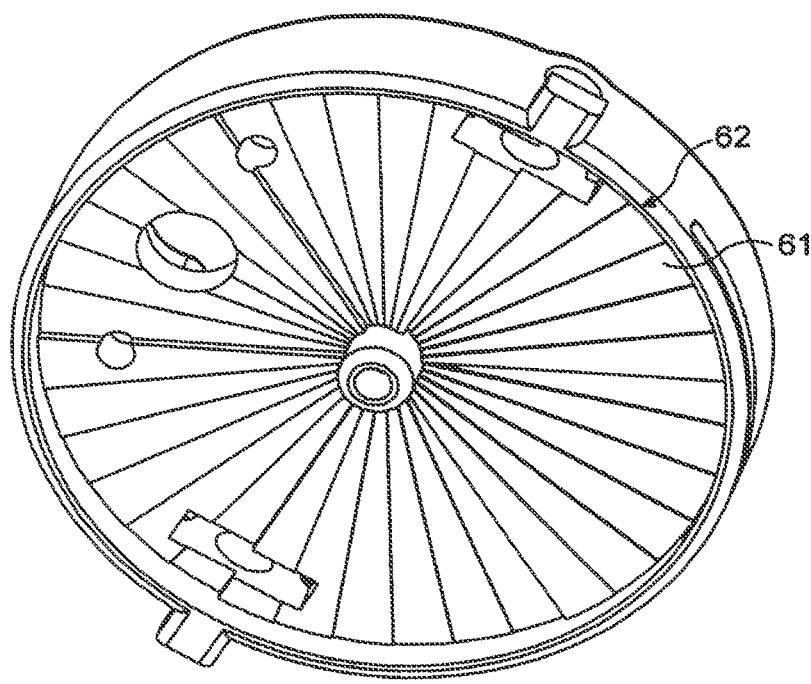
FIG. 7 shows a first part of a structure for adjusting the force with which the device is clamped against the cartridge.
Figure 8:
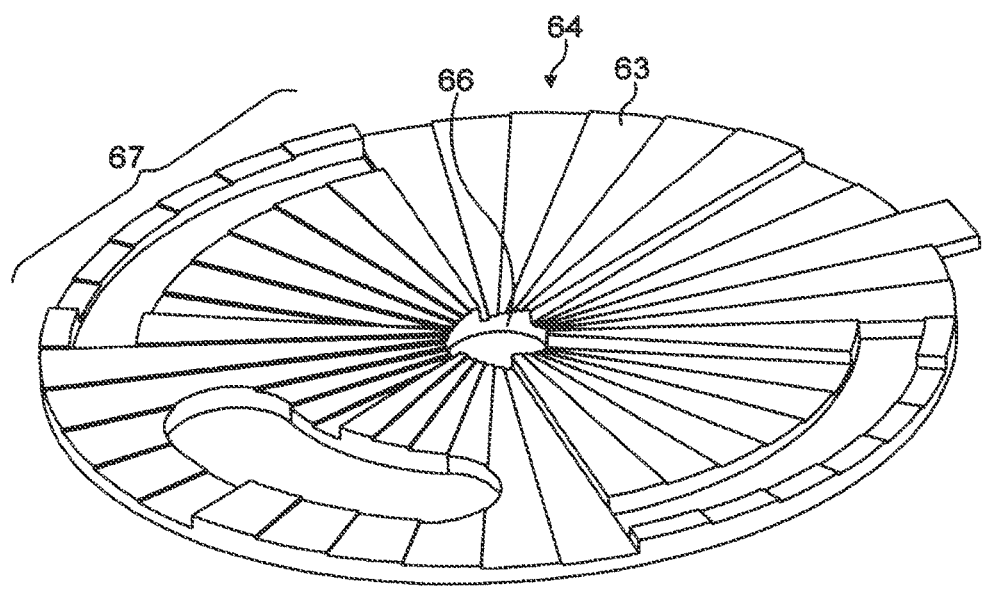
FIG. 8 shows a second, complementary, part of the structure for adjusting the clamping force of the device.
Figure 9:
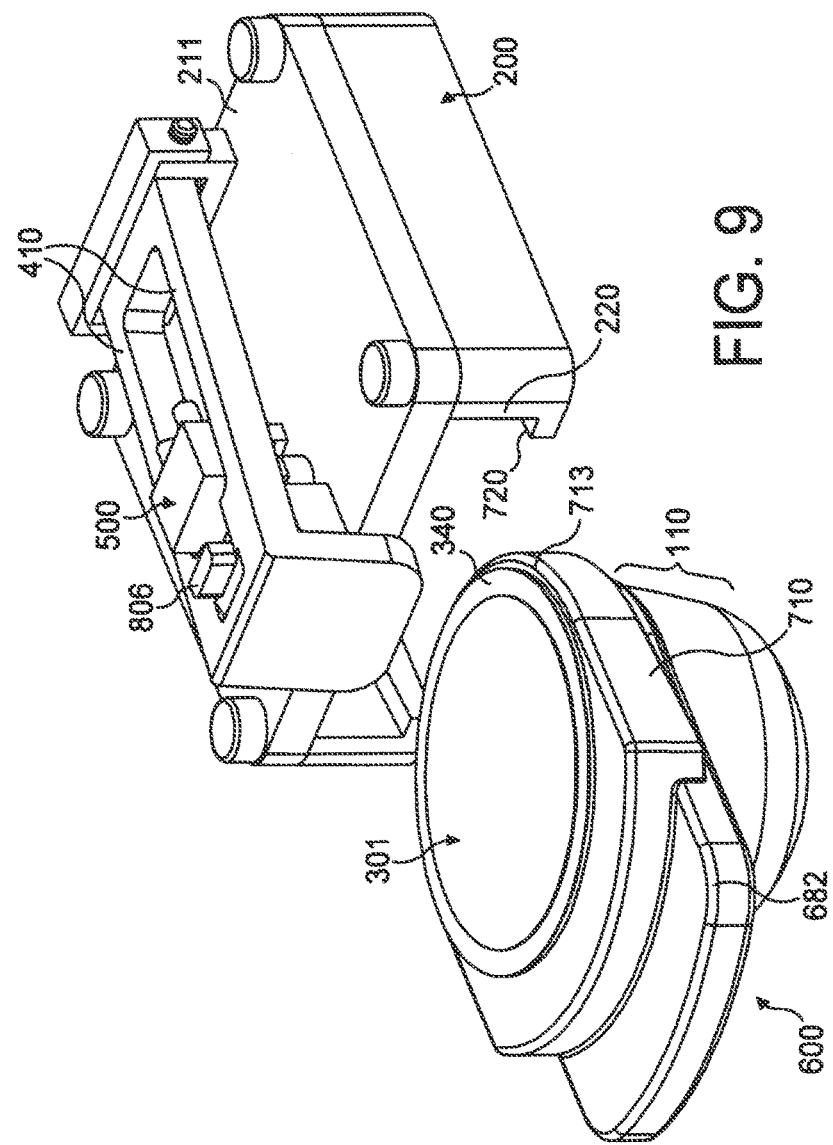
FIG. 9 shows a perspective view of the device according to a second embodiment, particularly of the supply unit in the open position and of the cartridge holder in the detached position.
Figure 10:
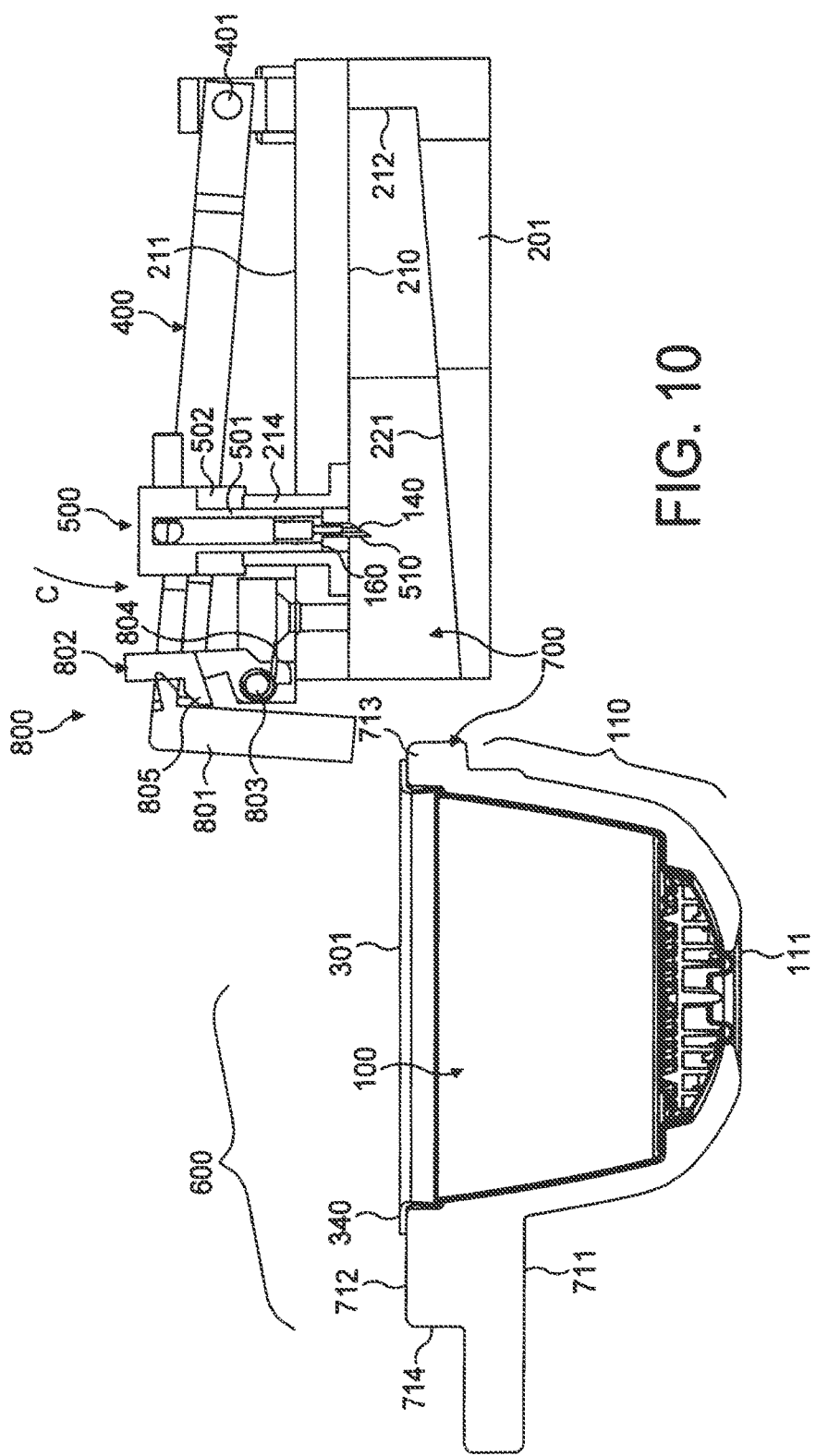
FIG. 10 shows a view in cross section on the longitudinal central axis of the cartridge holder of FIG. 9.
Figure 11:
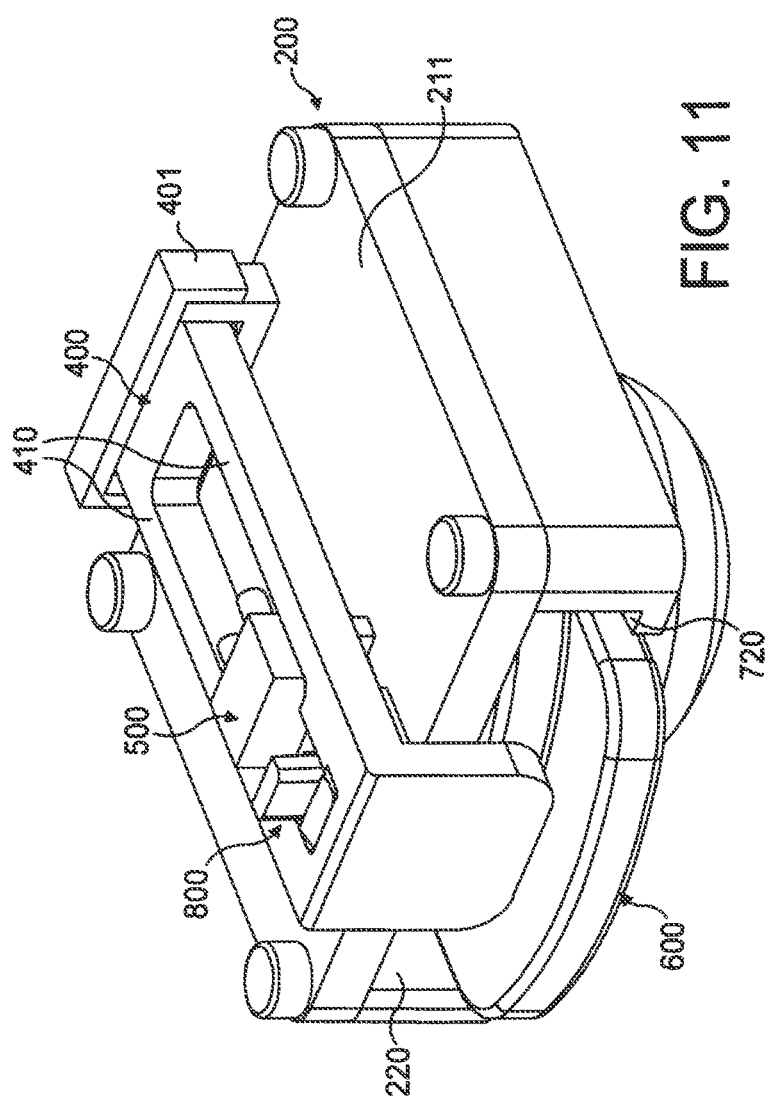
FIG. 11 shows a perspective view like in FIG. 9, with the cartridge holder in the insertion position.

The adjusting means may comprise a set of shims of varying thicknesses for the movable support plate, for example, as shown by FIGS. 7 and 8. According to a preferred embodiment, a set of shims is formed by associating a first shimming structure 61 belonging to a first wall 62 with a second shimming structure 63 belonging to a second wall 64 of the movable support. FIGS. 5, 7 and 8 show the principle of this. The two walls 62, 64 are disc-shaped. A bottom third wall 68 supports the wall 64. The bottom wall 64 is mounted in such a way that it can be adjusted in terms of rotation with respect to the top wall 62 which is fixed. The wall 62 has a central peg 65 into which the wall 64 is inserted via a central hole 66. The two walls 62, 64 have shimming structures comprising series of steps 67 forming different shimming levels. To each series or group of series there corresponds a predetermined stiffness of the movable support. The desired thickness is chosen by rotating the wall 64 with respect to the wall 62 so as to bring the two structures into coincidence for shimming of a thickness that varies progressively according to the relative rotational position. The rotationally adjustable wall 64 is accessible via a disconnectable connector 69 such as a screw, which is inserted into the central peg 65 which itself has an internal screw thread.

The adjusting means may be omitted particularly when the movable support has an elastic surface extending as far as the clamping portion 60, this making it possible naturally to compensate for any mechanical play and/or any possible dimensional variations between cartridges.

Another problem of the invention consists in reducing the risk of creating a jet of liquid out of and on the same side as the injection face of the cartridge once the injection means have been removed, more specifically from the intrusive portion of the injection spike, out of the cartridge. This phenomenon generally occurs, on the one hand because the cartridge is not completely emptied of its liquid after use and, on the other hand, because a raised pressure obtains in the cartridge after injection. To alleviate this disadvantage, the device according to the invention proposes a solution which consists in reducing the internal volume of the cartridge prior to injection and re-establishing the volume of the chamber when the injection means are withdrawn from the cartridge. This variation in cartridge volume makes it possible to create enough absorption volume to at least partially compensate for the raised pressure inside the cartridge. Instead of the gases expanding to the outside of the cartridge by squirting fluid, this expansion takes place within a predefined expansion volume.

To do that, one solution is to provide a raised engagement portion 15 of the movable support which is configured to drive the wall 10 of the cartridge toward the inside of the cartridge and thus decrease the internal volume of the cartridge. The engagement surface forms part of the bottom wall 68 of the movable support. Because the injection surface of the cartridge is flexible enough, for example is a membrane a few tenths of a millimeter thick, this surface deforms upon contact with the engagement surface of the movable support when this is brought into the injection position. The engagement surface 15 closely espouses the shape of the membrane of the cartridge during injection as a result of the internal pressure obtaining in the cartridge which distends the membrane toward the said surface 15. The engagement surface 15 could be made of an elastic material acting as a sealing element on the surface of the cartridge. In such a case, the ring 16 can be replaced by an elastic sealing wall which covers substantially the entire membrane 10 of the cartridge. The elastic sealing wall also may extend further as far as the clamping portion 60. A configuration such as this reduces the number of parts and is able to guarantee compensation for play and guarantee sealing even if the membrane has been accidentally punctured before it is inserted into the cartridge holder or has become delaminated as the pressure rises.

When the movable support is removed, the engagement surface 15 no longer exerts any thrust against the cartridge and the injection surface tends, at least in part, to return to its original position or even to a convex position through the effect of the expansion of gas inside the cartridge.

The wall of the support may thus form a convex engagement portion 15 which is impressed into the top surface of the cartridge, driving this toward the inside of the cartridge.

As a preference, the injection means are arranged with an offset configuration with respect to the central axis O of the said movable support. Likewise, the most raised point of the said surface is laterally distant from the injection means. The point and the height of the convexity depend on the engagement surface, on the volume of the cartridge and on other factors that make it possible to drive this surface down in such a way as to form sufficient internal expansion space within the cartridge. The maximum thickness of the raised part of the engagement surface 15 with respect to the base may be approximately 2 to 5 mm.

A second possible embodiment is illustrated in FIGS. 9 to 12. As in the previous embodiment, the device comprises a cartridge holder 600 detachable from the fluid supply unit 200 which is secured to the remainder of the device as in FIG. 1. The cartridge holder has a free support portion 110 which is wide open at the top and forms a shell to accept a cartridge 100 and has a delivery opening 111 of smaller cross section on the opposite side to allow the liquid to pass through from the delivery face of the cartridge. The cartridge thus rests in the cavity formed by the free portion or shell and its edges 340 rest against the upper edges 713 of the cartridge holder.

The cartridge holder is designed to be inserted along the edges of the supply unit simply by sliding. The cartridge holder has a handle 682 for ease of handling when inserting and removing it. The cartridge holder and the fixed base part 201 of the unit have complementary insertion means in the form of wedges 700. The principle behind these means is that they allow sliding insertion followed by sufficient wedging of the cartridge holder in the base part in its insertion position under the combined effect of the geometry of the complementary insertion means and of the fluid pressure exerted in the cartridge. As soon as the system is pressurized, friction forces between the cartridge and the supply unit increase so as to clamp it against the cartridge holder and so that the cartridge holder can thus no longer be removed by the user even without a mechanical latch being present.

To achieve this, the cartridge holder 600 comprises two lateral edges forming ribs 710 of variable thickness. More specifically, the edges or ridges are of a thickness that decreases in the direction of the free insertion end of the cartridge holder. The lower ridge 711 of the lateral edges forms a slope and diverges toward the upper ridge 712 in the direction of insertion of the cartridge holder into the unit. The ribs therefore have a thickness defined by the ridges 711, 712 which decreases gradually toward the free end 713 of the cartridge holder.

On the supply unit side, the fixed base part 201 comprises a portion in the shape of an inverted U with an upper transverse engagement surface 210 and two laterally spaced apart edges 220 extending downwards to form guide grooves 720. The ribs are of a variable height particularly with a retaining surface 221 which converge toward the transverse engagement surface 210 and toward the bottom 212 of the base part. It will be appreciated that, as the cartridge holder 600 is gradually inserted into the supply unit, the upper edges 713 of the cartridge holder gradually move closer to the engagement surface 210 of the base part. The angle formed by the ribs of the cartridge holder and the angle formed by the grooves may differ by a few degrees in order to allow wedging under the effect of the pressure in the cartridge. It will also be noted that, because the front part of the cartridge holder is more tapered than the part toward the handle, the spike 140 of the injection means does not impede the entry of the cartridge holder and, in particular, does not lacerate the upper surface of the cartridge.

The slope formed by the wedge-shaped insertion means 700 also allows the cartridge holder, once it has been inserted in the base part, to be positioned at an inclination of a few degrees with respect to the horizontal. This inclination greatly reduces, if not eliminates, the resurgence phenomenon by keeping the cartridge inclined and keeping a volume of gas and/or of air around the injection point, which means that, as the injection means are withdrawn, a sufficient volume of gas and/or air escapes in place of pressurized liquid. The inclination is kept in this position until the injection spike is removed from the cartridge. In particular, the ridge or retaining surface 221 of the guide grooves of the base part is preferably horizontal so as to raise up the rear of the cartridge, that is to say the handle side of the cartridge, and therefore the injection point of the cartridge. As a result, as the cartridge holder is removed by sliding, the cartridge 100 remains inclined (leaning forwards and downwards) in order to keep the liquid level in the cartridge below the injection point.

It will therefore be readily understood that the ridge-shaped insertion means may perform two functions: a first "self-locking" clamping function and a second function of raising the injection point in order to avoid resurgence of liquid.

The supply unit may comprise a locking means 800, the main function of which is to lock the injection means in the injection position relative to the cartridge.

The locking means may have the additional function of keeping the cartridge holder in place in the insertion position inside the unit; the locking means there serving to ensure that the cartridge holder has reached its final insertion position, that is to say that it is sufficiently engaged in the supply unit.

Advantageously, this locking means is secured to a lever 400 which controls the actuation of the injection means 500 so that the locking of the cartridge holder is performed at the same time as the engagement for injection purposes of the injection means 500 secured to the support with the cartridge and by manual actuation of the movable support.

Thus, the lever 400 is articulated to the movable base part about a transverse pin 401 substantially parallel to the surface of the base part 210. The support and/or the injection means themselves comprise elastic return means allowing the injection means to return to the "raised" position or disengaged position with respect to the cartridge. For preference a spring 502 is associated with the injection means.

The lever 400 transmits to the injection means 500 the manual closure force of the user, this force being illustrated by the downward direction of the arrow C. The support is therefore capable of pivoting between a position in which the injection means 500 are vertically distant from the cartridge or the cartridge holder in the insertion position and an injection position in which the injection means are engaged against or through the cartridge. The support 500 has two lateral arms 410 thus forming a central slit which allows the injection means 500 to be guided with respect to the support in such a way as to convert the rotational movement of the support into a translational movement of the injection means.

It should be noted that the support is positioned on the upper surface 211 of the base part in such a way that the injection means 500 have to pass through the base part in order to come into contact with the cartridge upon movement of the lever. The injection means comprise a guide portion 501, for example, cylindrical, guided through the base part via a passage delimited through a sleeve 214. As a result, the rotational force on the support is transmitted into a linear force on the injection means which become inserted in the cartridge at right angles to the injection surface.

It should be noted that the support 500 and the locking means 800 may adopt various forms. Thus, it is possible to conceive of a more compact solution in which the injection means form a push-button to move from an engaged or "depressed" position, into a disengaged position simply through manual pressure exerted on the top of the means 500.

The injection means end in the direction of the cartridge holder in an injection spike 510 through which a water-carrying duct 140 passes. The injection spike is equipped on its periphery with a local sealing means 160. This sealing means may be formed of a special-purpose sealing component such as an elastomeric ring or the like or may simply be a transverse annular continuation of the guide portion 501 capable of bearing against the injection surface 301 of the cartridge.

Figure 12:
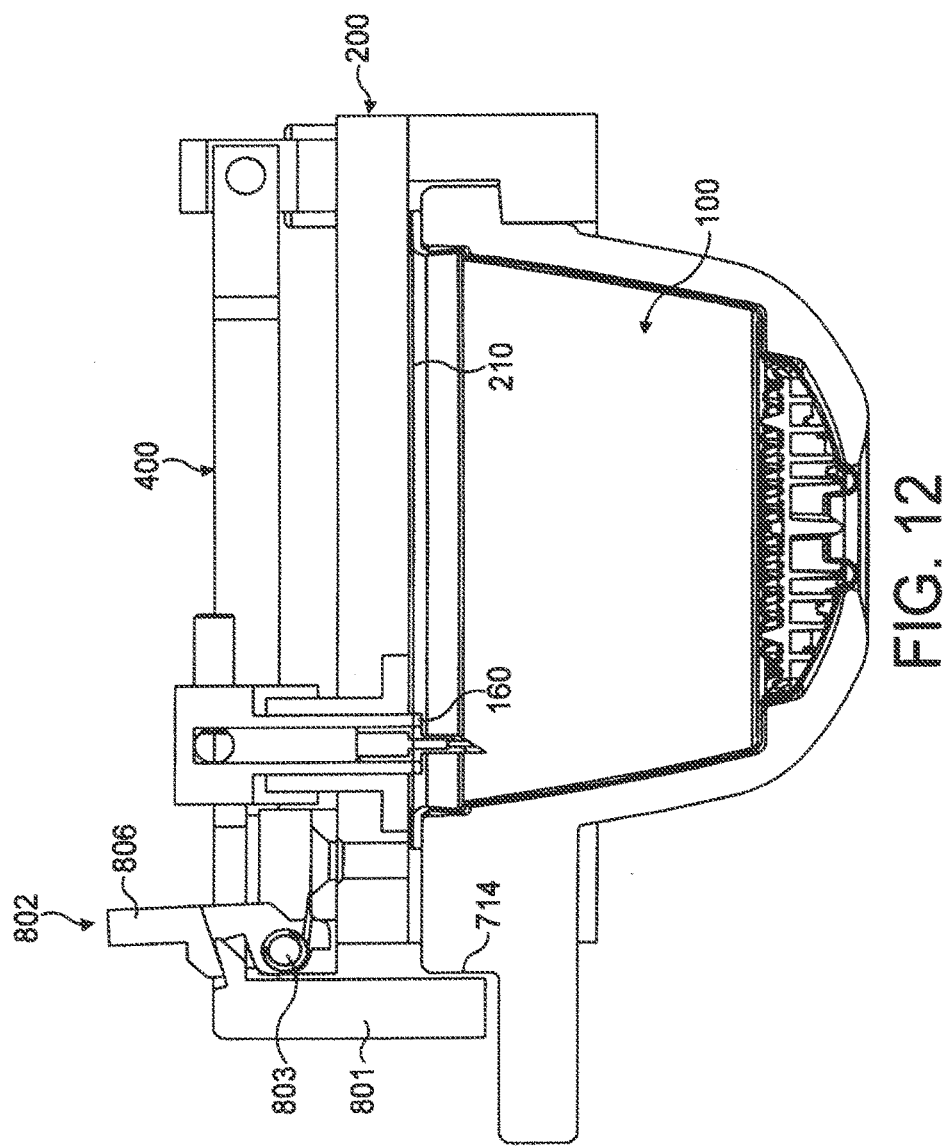
FIG. 12 shows a view of FIG. 11 in cross section.
Figure 13:
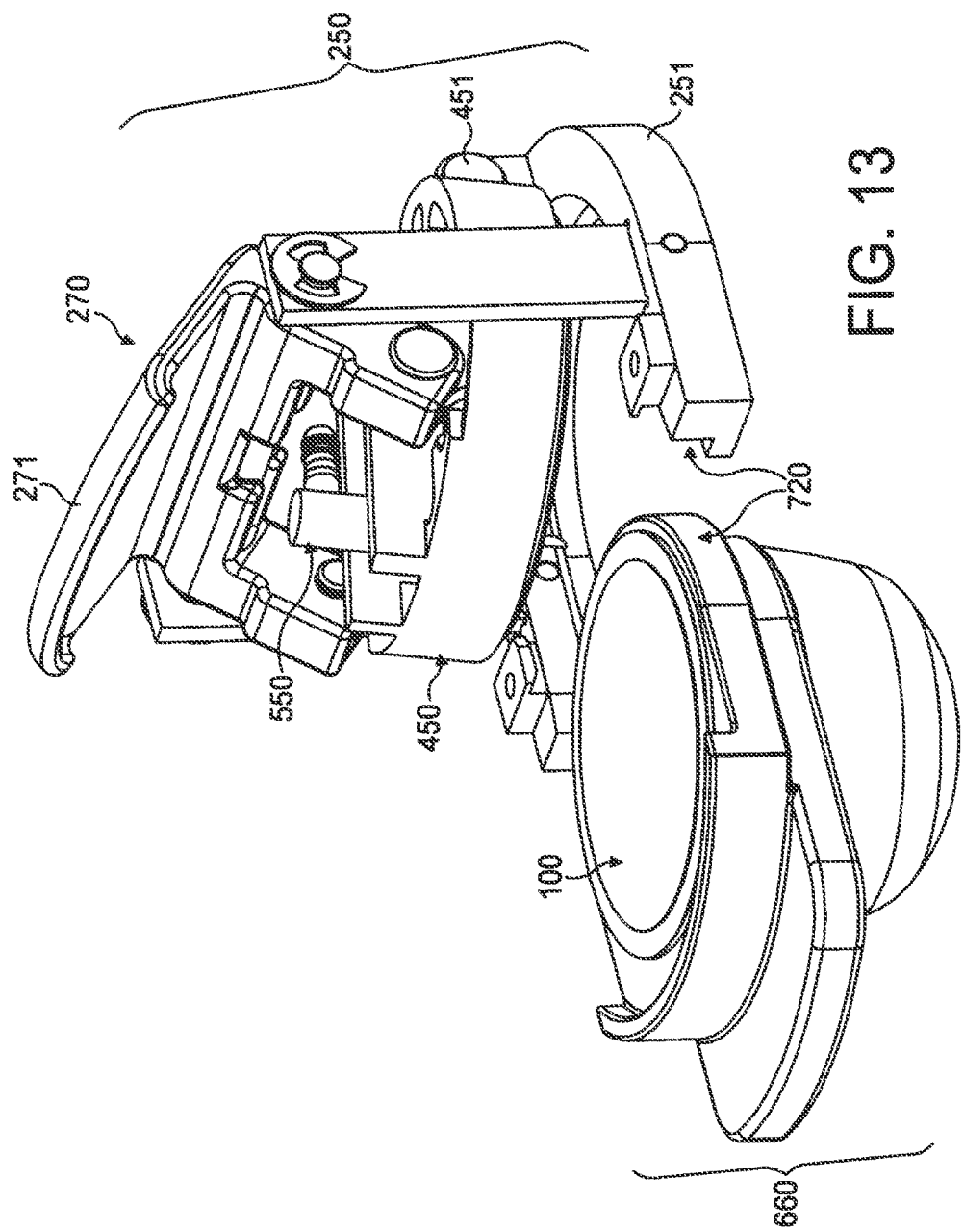
FIG. 13 shows a perspective view of the device according to a third embodiment, particularly with the supply unit in the open position and the cartridge holder in the detached position.

As has already been mentioned, arranged at the opposite end to the pivot pin 401 that articulates the support 400 to the base part 200 there is a locking means 800 for locking the cartridge holder. This means comprises a stop wall 801 extending the support downwards. The means may thus be actuated by the user once the cartridge holder has been inserted into the base part. The stop wall then engages in locking manner against a transverse edge 714 of the cartridge holder as shown by FIG. 12. The wall is kept in the locked position via a latch 802 which is mounted to rotate on the base part about a pin 803 and against the action of a spring 804 and comprises an engagement portion 805 for engaging with the support and an actuatable keeper 806 to drive the engagement portion into the latch-open position.

The way in which this second embodiment of the invention works is as follows. The cartridge holder is reloaded with a new cartridge and is then inserted into the supply unit via the guide means 700. Prior to insertion, the injection support 500 is in the raised position and the wall 801 is therefore clear of the entry to the supply unit. The cartridge holder is inserted into the base part by sliding via the insertion means 700. Once it is in its final insertion position, the user can close the latch by depressing the front end of the support 400 which thus acts as a locking lever. The locking means 800 then engages by means of the latch 802 and the cartridge holder cannot be disengaged without opening the keeper 802. Fluid can then begin to be injected into the cartridge by actuating the control means 42. The effect of injecting liquid into the cartridge clamps the internal surface 210 against the edges 340 of the cartridge in the cartridge holder thus ensuring that the cartridge holder is held firmly in the supply unit. After fluid has been injected into the cartridge and the beverage has been delivered through this cartridge, the user can remove the cartridge holder by opening the keeper 802. The movable support 400 then rises back up to the raised position under the effect of the injection support 500 which pushes it back as a result of the return spring 214. The upwards movement of the injection support 500 disengages the spike from the cartridge. Degassing occurs through the injection point until the pressures inside and outside the cartridge equalize. The cartridge holder can then be removed by sliding it while at the same time keeping the level of liquid in the cartridge below the injection point because of the inclination maintained by the cartridge holder in the injection unit.

FIGS. 13 to 16 illustrate a third possible embodiment of the invention. As in the previous embodiments, the device comprises a cartridge holder 660 that can be detached from a pressurized fluid supply unit 250 and insertable via insertion means 720 substantially identical to those 7 of the embodiment of FIGS. 1 to 6. This third embodiment also comprises injection means 550 supported by a movable support 450 which is actuated by actuating means 270 such as a toggle lever and a lever 271, like those described earlier.

An essential difference, however, lies in the movement of the injection means against the cartridge. Specifically, in this embodiment, the movable support 450 is mounted on a pivot pin 451 situated on the front side of the support and guided axially in such a way as to allow the movable support to be moved in a combined translational and rotational movement against the cartridge holder. More specifically, the movable support comprises a pin 451 parallel to the transverse plane of the support 450, mounted in one or more axial guide housings or slots 452 belonging to the base part 251 directed parallel to the central axis of the housing of the cartridge holder allowing the support to move both in a rotational direction D and in an axial translational direction E. The advantages over the previous embodiments are essentially linked to a setup that is able to compensate for functional play while at the same time avoiding wear by comparison with a purely linear and axial movement while at the same time clearing the edges 345 of the cartridge upon reopening. The support is actuated by a lever 271.

Figure 14:
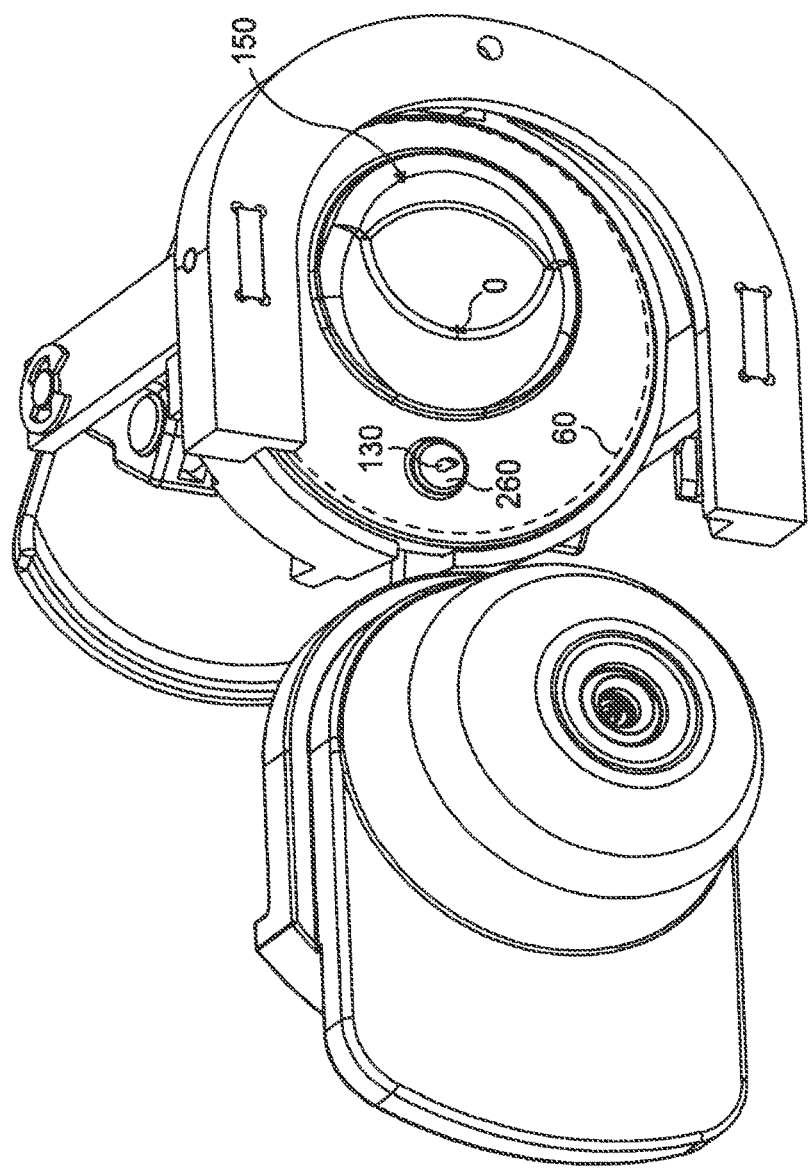
FIG. 14 shows a view of the device according to the third embodiment from underneath and in perspective.
Figure 15:
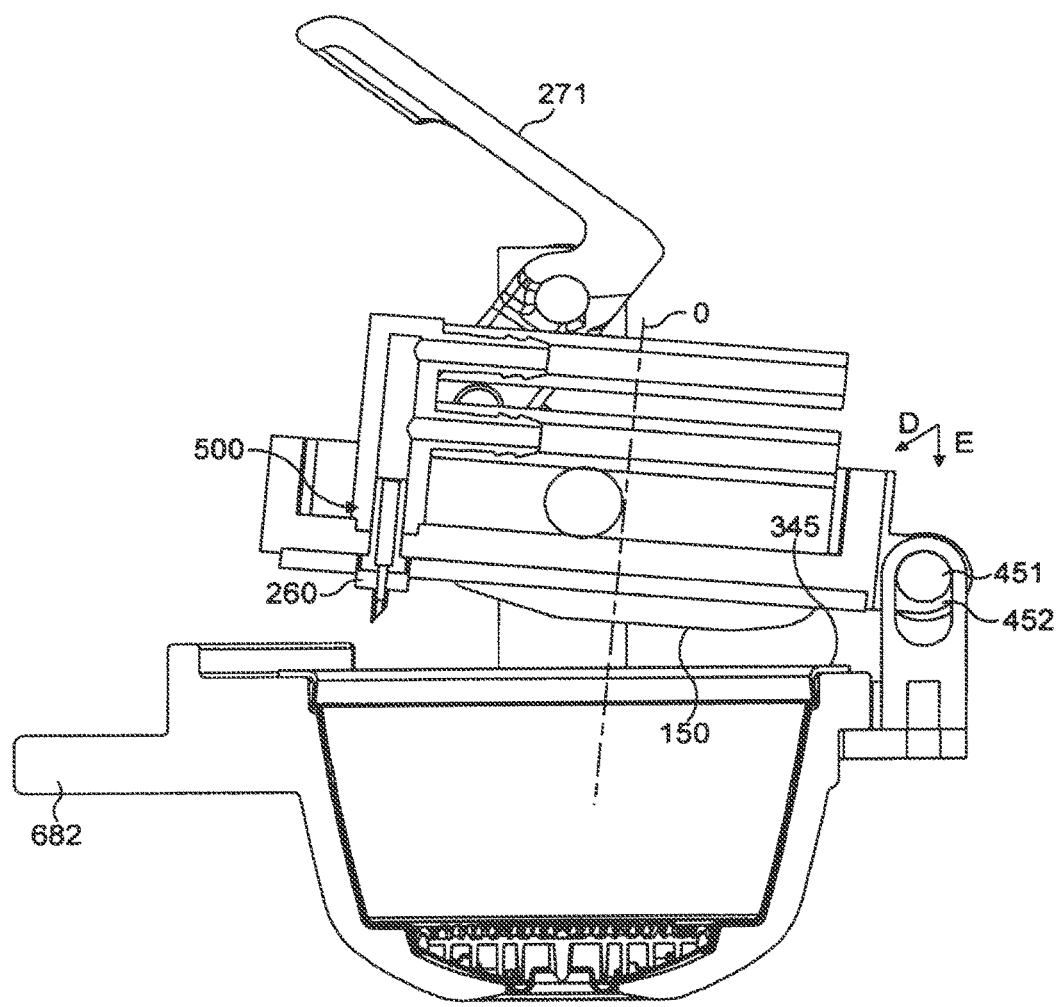
FIG. 15 shows a view in cross section on the longitudinal central axis of the cartridge holder of FIG. 13 with the cartridge holder in the insertion position before the injection unit is closed.
Figure 16:
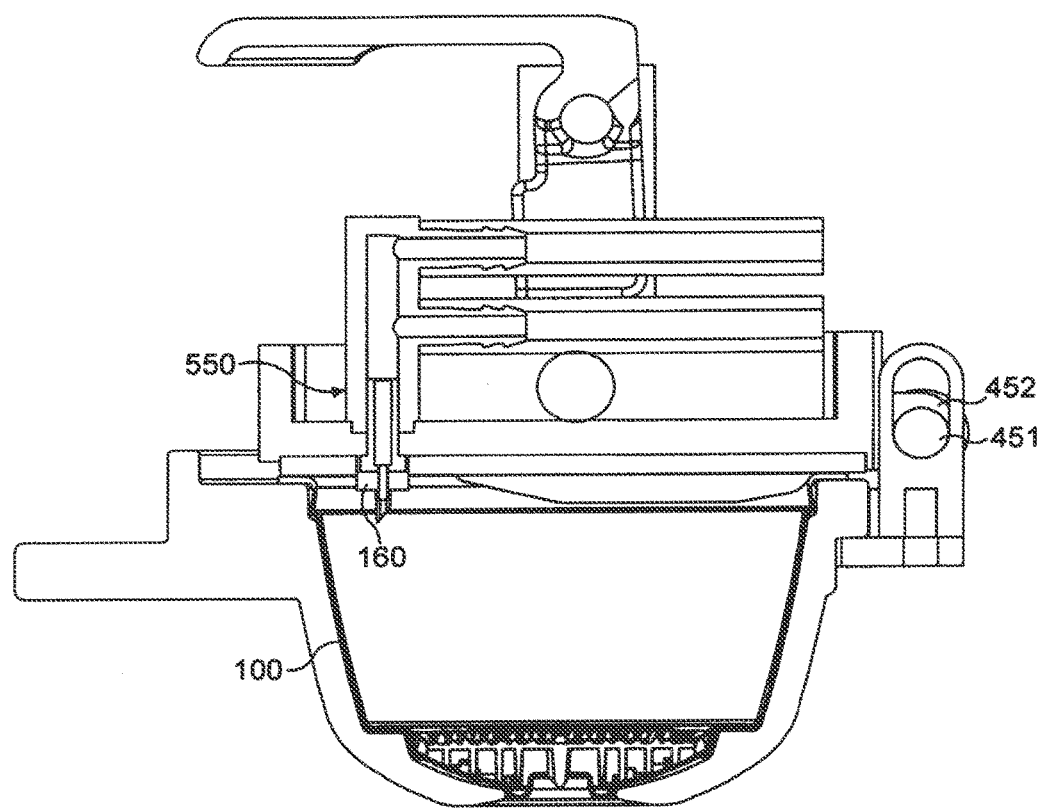
FIG. 16 shows a view in cross section according to the third embodiment with the supply unit in the closed position.

As shown by FIGS. 14 to 16, the movable support comprises a convexly-shaped engagement portion 150 that makes it possible to reduce the volume of the cartridge upon closure for the same reasons as those already described. The engagement portion 150 partially occupies the surface of the movable support and is separated from the injection spike 130 which is offset from the central axis O of the support.

The movable support may comprise a ring or localized raised portion 260 made of elastic material 160. This ring or raised portion may be replaced by an underside of the support that is partially or completely coated with an elastic material, even the engagement surface 150.

As shown by FIG. 14, the injection support 450 has a clamping portion 60 (shown in dotted line) located at the periphery of the underside of the support. This portion may also be an elastic material. The clamping portion 60 bears against the edging 345 of the cartridge as the injection portion is engaged against the cartridge (FIG. 16). It will thus be understood that sealing is essentially achieved immediately around the injection spike by the ring or the raised portion 260 and that the clamping portion has the essential function of locking the cartridge holder in place and preventing the welded seam around the cartridge from delaminating.

Figure 17:
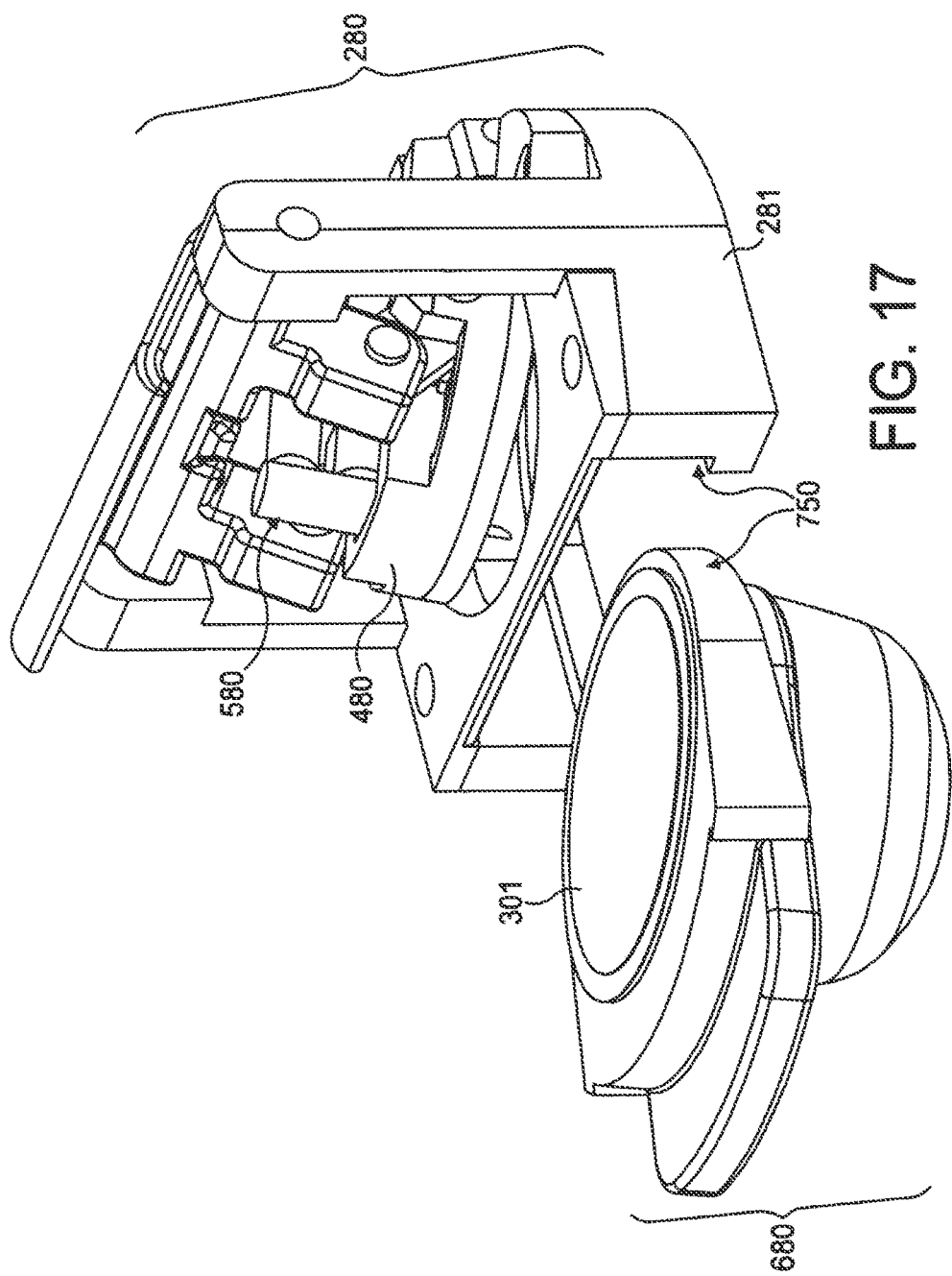
FIG. 17 shows a perspective view of the device according to a fourth embodiment, particularly with the supply unit in the open position and the cartridge holder in the detached position.
Figure 18:
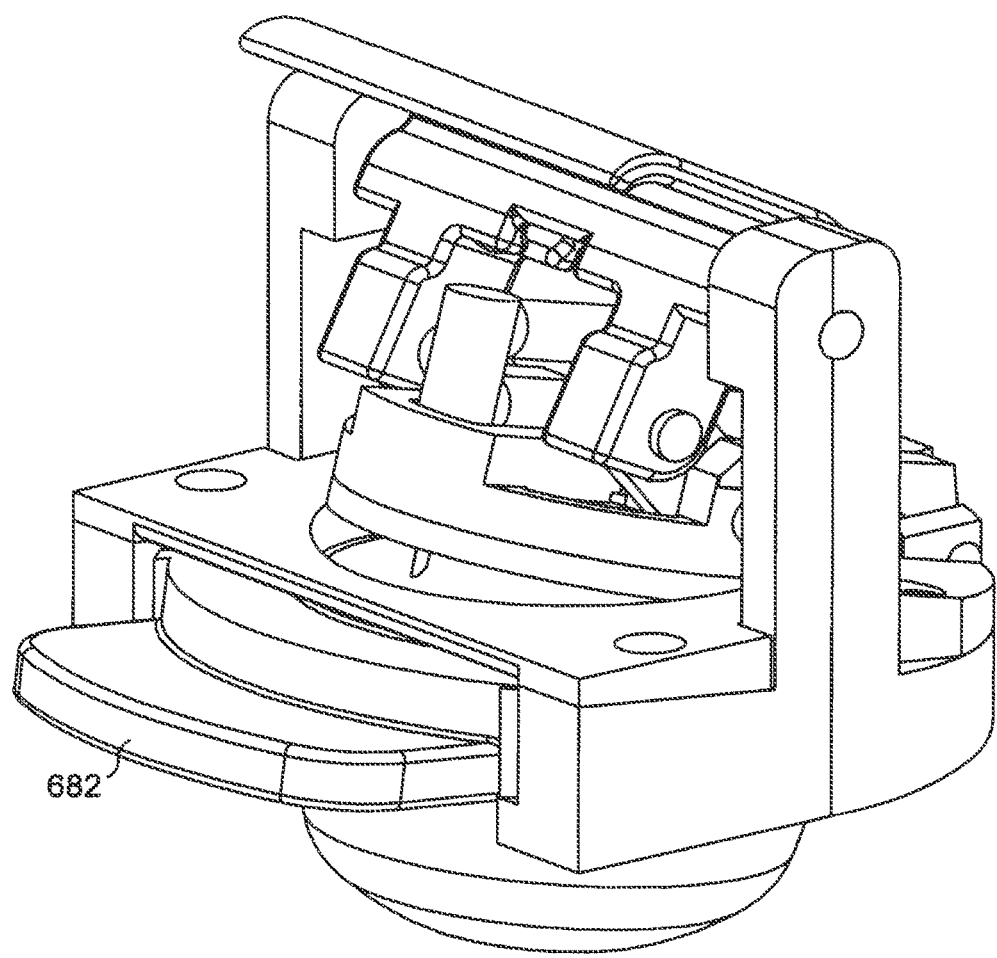
FIG. 18 shows a perspective view of the device of FIG. 16 in the mode for insertion of the cartridge holder before the supply unit is closed.
Figure 19:
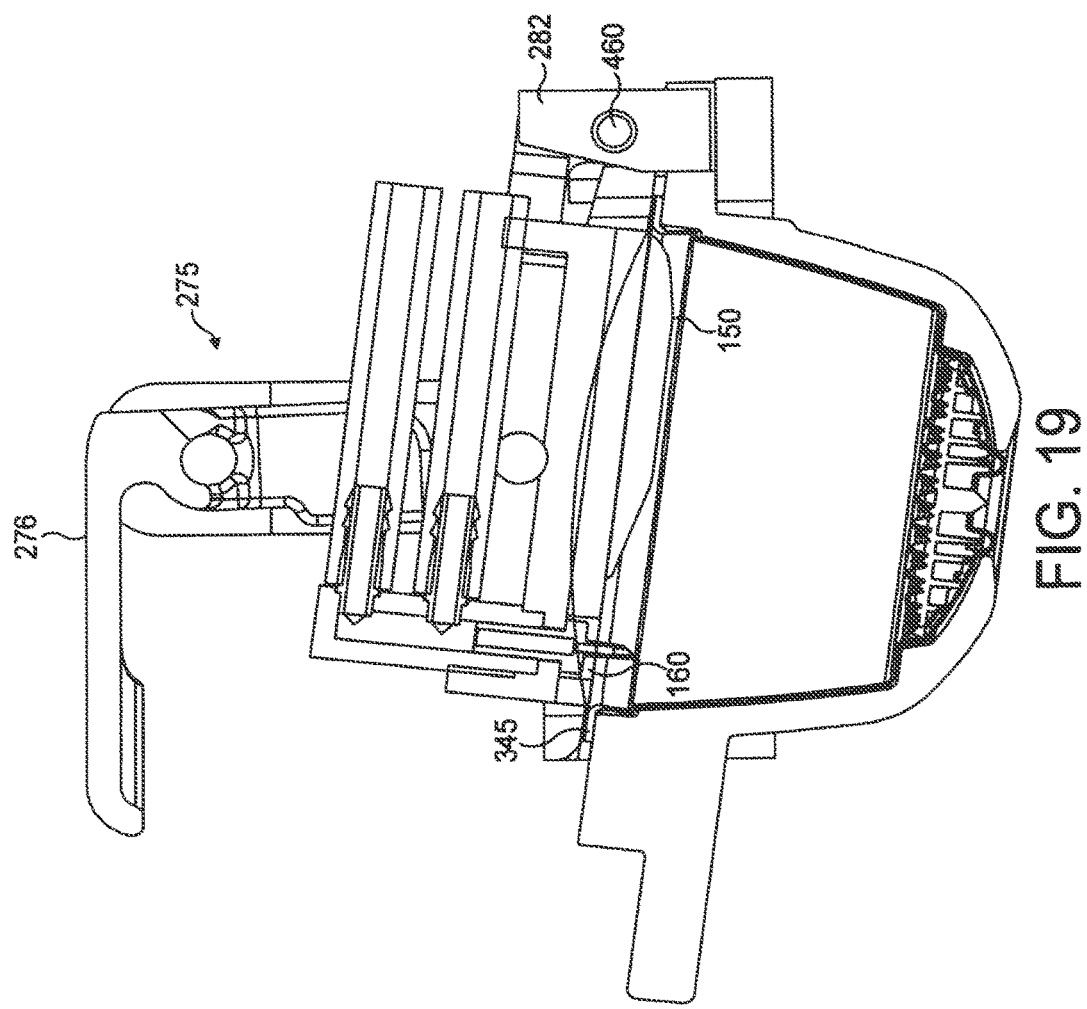
FIG. 19 shows a view in section on the longitudinal central axis of FIG. 18 with the supply unit in the closed position.

FIGS. 17 to 19 show another embodiment of the invention. In this case, the cartridge holder 680 and the base part 281 of the supply unit 280 are equipped with wedge-like insertion means 750 identical to those described in the embodiment of FIGS. 9 to 12. The supply unit for its part has a support 480 on which the injection means 580 are arranged, which injection means can be moved in a direction that combines rotation and axial movement. More specifically, the disc-shaped movable support 480 is mounted on a fixed extension portion 282 of the base part about a pivot pin 460 situated on the side, for example, at the rear, of the disc. Movable support is actuated by actuating means 275 of the toggle lever type and a lever 276 as in the embodiment of FIGS. 1 to 6. The injection means are identical to those of the embodiments of FIGS. 1 to 6. Upon closure, the edges 345 of the cartridge are clamped by an annular clamping portion of the movable support 480. Likewise, the movable support comprises an engagement surface 150 of convex shape which allows the volume of the cartridge to be reduced upon closure for the same reasons as those already described.

Of course, the invention is not restricted to the embodiments thus described either, but extends to other possible embodiments that fall within the scope of the attached claims.

The invention is claimed as follows:

1. A device for preparing a liquid beverage from a cartridge, the device comprising:
    a supply unit for supplying injection fluid to the cartridge, the supply unit comprising an injection support and further comprising an injector, the injection support comprising a raised engagement portion distanced from the injector and configured to drive a flexible wall of the cartridge toward an inside of the cartridge, the injector comprising a liquid-carrying duct that passes through the injector, the injector fluidically connected to a fluid source and configured to inject pressurized fluid from the fluid source into the cartridge;
    a cartridge holder configured to accept and support the cartridge, the cartridge holder detachable from the supply unit, the cartridge holder comprising a cartridge opening configured for the cartridge to be inserted into an interior of the cartridge holder that receives the cartridge, and a portion of the interior that receives the cartridge comprising a delivery opening of smaller cross section than the cartridge opening, the delivery opening positioned on a directly opposite side of the interior of the cartridge holder from the cartridge opening, the injector configured to move into engagement relative to the cartridge contained in the cartridge holder;
    an inserting guide configured to allow the cartridge holder to be inserted from a detached position to an inserted position;
    a seal associated with the injector and configured to provide sealing at least locally and directly between the injector and an injection surface of the cartridge; and
    a clamp configured to apply a clamping force to clamp the supply unit against a bearing edge of the cartridge holder and/or edges of the cartridge.

2. The device according to claim 1, wherein the clamp comprises a clamping portion of the injection support, the clamping portion configured to engage an axial component with an edging of the cartridge which rests on the bearing edge of the cartridge holder.

3. The device according to claim 2, wherein the clamping portion and the bearing edge of the cartridge holder form, with the edging of the cartridge, a clamping surface that is substantially circumferential and continuous.

4. The device according to claim 3, wherein the seal is elastic and locally surrounds a base of the injector.

5. The device according to claim 4, wherein the seal is made of a material selected from the group consisting of elastomer and silicone.

6. The device according to claim 3, wherein the seal is elastic and extends over an area of the injection support configured to entirely cover the injection surface of the cartridge.

7. The device according to claim 6, wherein the seal extends over the clamping portion of the injection support.

8. The device according to claim 1, wherein the raised engagement portion comprises an engagement surface, the engagement surface is elastic and seals against the flexible wall of the cartridge.

9. The device according to claim 1, wherein the injector is located in a region offset from a central axis of the injection support.

10. The device according to claim 1, wherein the injector comprises at least one injection spike, and the liquid-carrying duct passes through the injection spike.

11. The device according to claim 1, wherein the injector is configured to move in a straight path.

12. The device according to claim 1, wherein the injector is configured to move in a path that combines at least one rotational component and one axial component.

13. The device according to claim 1, wherein the inserting guide comprises ribs and guide grooves to allow the cartridge holder to be inserted by sliding the cartridge holder into the supply unit.

14. The device according to claim 1, wherein the clamp comprises a toggle lever or a cam actuated by a lever.

15. The device according to claim 1, wherein the inserting guide comprises the clamp and is configured to lock the cartridge holder in the insertion position with pressurized fluid injected into the cartridge.

16. The device according to claim 15, wherein the inserting guide is wedge-like.

17. The device according to claim 16, wherein the inserting guide comprises ribs associated with grooves of progressively variable height.

18. A system comprising the device according to claim 1 and a cartridge, the cartridge having a body comprising an edging to which a flexible membrane that forms an injection wall is sealed.

19. The device according to claim 1, wherein the injector extends from a first section of the injection support, and the raised engagement portion extends from a second section of the injection support, the first second of the injection support distanced from the second section of the injection support.

20. A device for preparing a liquid beverage from a cartridge, the device comprising:
    a supply unit for supplying injection fluid to the cartridge, the supply unit comprising an injection support and further comprising an injector, the injection support comprising a raised engagement portion distanced from the injector and configured to drive a flexible wall of the cartridge toward an inside of the cartridge, the injector comprising a liquid-carrying duct that passes through the injector, the injector fluidically connected to a fluid source and configured to inject pressurized fluid from the fluid source into the cartridge;
    a cartridge holder configured to accept and support the cartridge, the cartridge holder detachable from the supply unit, the cartridge holder comprising a cartridge opening configured for the cartridge to be inserted into an interior of the cartridge holder that receives the cartridge, and a portion of the interior that receives the cartridge comprises a delivery opening of smaller cross section than the cartridge opening, the delivery opening positioned on a directly opposite side of the interior of the cartridge holder from the cartridge opening, the injector configured to move, together with the injector support, into engagement relative to the cartridge contained in the cartridge holder;
    an inserting guide configured to allow the cartridge holder to be inserted from a detached position toward a position in which the cartridge holder is engaged in the supply unit; and
    the injection support mounted on a base part and configured to be moved in a path that combines a rotational direction and an axial direction.

21. A device for preparing a liquid beverage from a cartridge, the device comprising:
    a supply unit for supplying injection fluid to the cartridge comprising an injection support comprising an injection spike, the injection spike comprising a liquid-carrying duct that passes through the injection spike, the injection spike fluidically connected to a fluid source and configured to inject pressurized injection fluid from the fluid source into the cartridge;
    a cartridge holder configured to accept and support the cartridge, and which is designed to close against the supply unit, the cartridge holder comprising a cartridge opening configured for the cartridge to be inserted into an interior of the cartridge holder that receives the cartridge, and a portion of the interior that receives the cartridge comprises a delivery opening of smaller cross section than the cartridge opening, the delivery opening positioned on a directly opposite side of the interior of the cartridge holder from the cartridge opening; and
    a supply support comprising an elastic seal configured to seal at least locally around the injection spike, and further comprising a raised engagement portion distanced from the injector and configured to drive a flexible wall of the cartridge toward an inside of the cartridge and thus reduce the internal volume of the cartridge.

22. The device according to claim 21, wherein the raised engagement portion is convex and spaced away from the injection spike.

* * * * *